United States Patent
Ho et al.

(10) Patent No.: US 9,111,394 B1
(45) Date of Patent: Aug. 18, 2015

(54) RENDERING BASED ON MULTIPLE PROJECTIONS

(75) Inventors: James Ho, Mill Valley, CA (US); Szymon Swistun, Belmont, CA (US); Sulabh Patel, San Mateo, CA (US); Nils Jonas Norberg, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 413 days.

(21) Appl. No.: 13/559,442

(22) Filed: Jul. 26, 2012

Related U.S. Application Data

(60) Provisional application No. 61/514,885, filed on Aug. 3, 2011.

(51) Int. Cl.
G09G 5/00 (2006.01)
G06T 15/50 (2011.01)

(52) U.S. Cl.
CPC .............. *G06T 15/506* (2013.01); *G06T 15/50* (2013.01)

(58) Field of Classification Search
None
See application file for complete search history.

(56) References Cited

U.S. PATENT DOCUMENTS

| | | | |
|---|---|---|---|
| 6,853,383 B2 | 2/2005 | Duquesnois | |
| 7,068,274 B2 | 6/2006 | Welch et al. | |
| 7,176,918 B2 | 2/2007 | Anderson et al. | |
| 7,184,043 B2 | 2/2007 | Anderson et al. | |
| 8,564,595 B1 | 10/2013 | Ho et al. | |
| 2009/0153577 A1 | 6/2009 | Ghyme et al. | |
| 2010/0033484 A1 | 2/2010 | Kim et al. | |
| 2012/0194516 A1* | 8/2012 | Newcombe et al. | 345/420 |
| 2013/0300740 A1 | 11/2013 | Snyder et al. | |
| 2013/0328870 A1 | 12/2013 | Grenfell | |
| 2014/0045592 A1 | 2/2014 | Ho et al. | |

OTHER PUBLICATIONS

"U.S. Appl. No. 13/559,453, Notice of Allowance mailed Aug. 16, 2013", 12 pgs.
"U.S. Appl. No. 14/057,796, Pre-Interview First Office Action mailed Apr. 16, 2015", 4 pgs.
"U.S. Appl. No. 14/057,796, Reply to Pre-Interview Communication filed May 15, 2015", 4 pgs.

* cited by examiner

*Primary Examiner* — Edward Martello
(74) *Attorney, Agent, or Firm* — Schwegman Lundberg & Woessner, P.A.

(57) ABSTRACT

A workflow for 3D content authoring, delivery, and rendering is facilitated based on pre-authored image projections to obtain improvements in authoring efficiency. Additionally, a content delivery platform centered on such pre-authored image projections provides a mechanism for significantly improving streaming efficiency for 3D worlds. Multiple images encode primary surface detail of 3D worlds in real-time applications. Examples of such projections include images that can be as rich as film frames, feature animation frames, high end digital renders, concept paintings, or any suitable combination thereof. An algorithm for improved image projection camera path trajectories, sampling selection, and blending may be implemented by various systems and methods to facilitate smooth transitions during movements of a player within a game set in the 3D space. In addition, a back-projection technique may be implemented by various systems and methods to propagate revisions of one or more projections.

20 Claims, 25 Drawing Sheets

RENDERING BASED ON MULTIPLE PROJECTIONS

RELATED APPLICATION

This application claims the priority benefit of U.S. Provisional Patent Application No. 61/514,885, filed Aug. 3, 2011, which is incorporated herein by reference in its entirety.

TECHNICAL FIELD

The subject matter disclosed herein generally relates to computer graphics. Specifically, the present disclosure addresses systems and methods of rendering based on multiple projections.

BACKGROUND

Conventionally, authoring three-dimensional (3D) graphical content involves creation of separate textures for each model or object. For example, a 3D model may be considered as an assembly of 3D surfaces wrapped into a 3D shape, and an artist may manually disassemble (e.g., unwrap) these 3D surfaces to obtain flat two-dimensional (2D) versions (e.g., in a coordinate space called "UV-space") and apply 2D textures to the flat versions of the model's surfaces. Typically, each texture has its own mipmaps for graphics processing unit (GPU) sampling correctness and efficiency. In large 3D worlds, there may be hundreds or thousands of objects, and the computational overhead in disassembling and texturing all these objects may be extremely high. Textures used by objects may be combined in texture atlases to reduce this overhead, though additional work may be involved.

BRIEF DESCRIPTION OF THE DRAWINGS

Some embodiments are illustrated by way of example and not limitation in the figures of the accompanying drawings.

DETAILED DESCRIPTION

Figure 1:
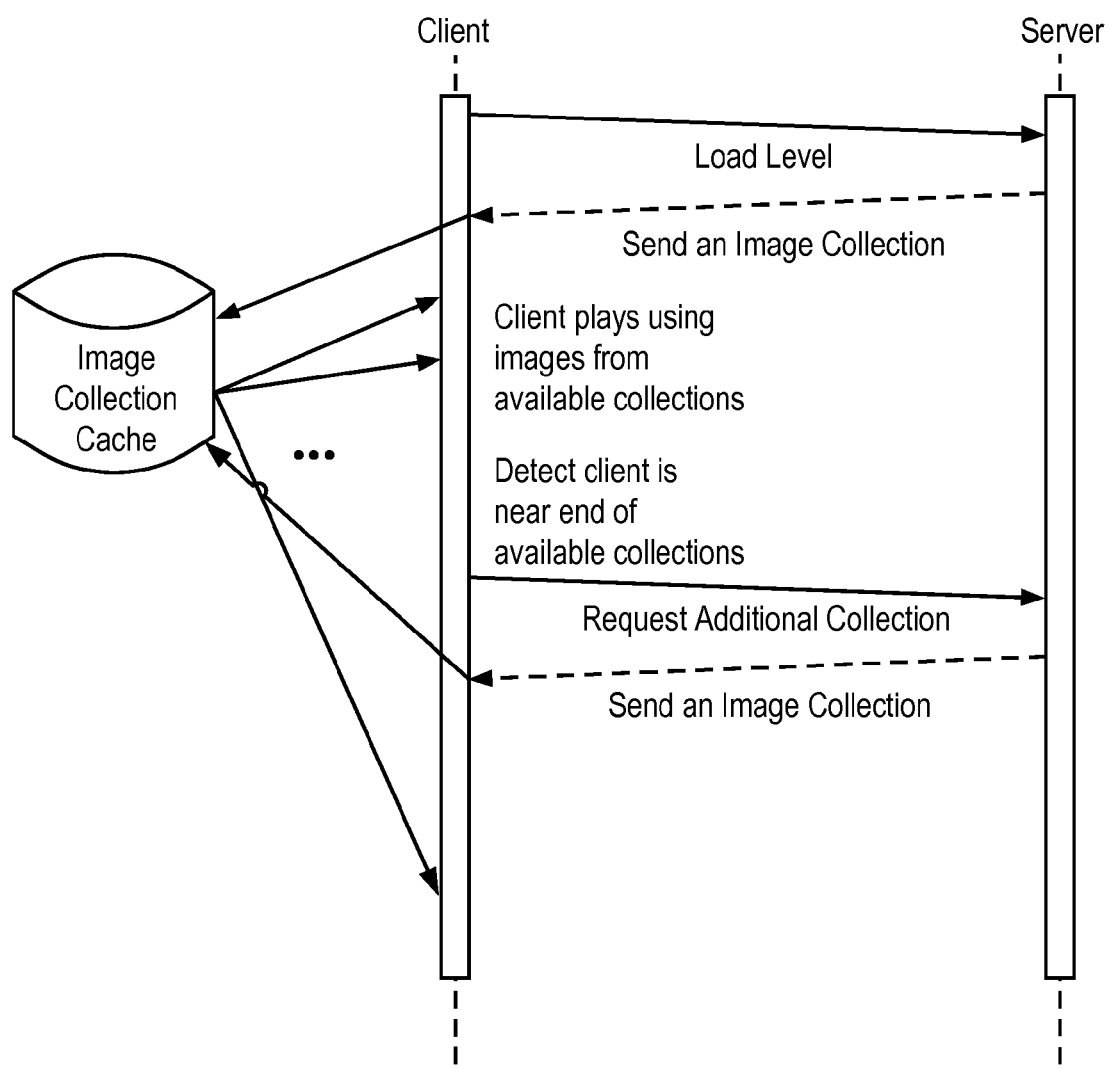
FIG. 1 is an interaction diagram that depicts an image projection transfer interaction between a client and server, according to some example embodiments.

Example methods and systems are directed to delivery of multiple projections for rendering, rendering based on multiple projections, or any suitable combination thereof. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A novel 3D content authoring workflow may be based around pre-authored image projection that improves authoring efficiency. Additionally, a content delivery platform centered around such pre-authored image projections may provide a mechanism for significantly improving streaming efficiency for 3D worlds.

Systems and methods described herein may use a multi-image projection for encoding primary surface detail of 3D worlds in real-time applications. An algorithm for improved image projection camera path trajectories, sampling selection, and blending may be implemented by these systems and methods to facilitate smooth transitions during movements. In addition, a back-projection technique may be implemented by the systems and methods to propagate changes to all projections for manual modifications of 3D surface detail via single projection image modifications.

The systems and methods discussed herein may provide one or more benefits, including for example:

the ability to more quickly and more easily author 3D surface detail for real-time applications than is generally available using traditional methods;

improved layouts for 3D world content that improve streaming behavior by drastically lowering the size of initial content downloaded by the end user;

a decoupling of surface detail from 3D model complexity, which may allow an art team to author surface detail more efficiently without constraints of 3D surface topology;

easy integration with industry standard commercial content creation tools, along with provision of high-resolution surface detail more efficiently to end users; and a mechanism to ensure fixed performance and bandwidth by enforcing a degree of simplicity in streaming images (e.g., projections) similar to that of streaming video, which, in turn, may provide consistent data transfer rates throughout.

In various example embodiments, the systems and methods may allow artists to work purely with final rendered images, painted images, or both, for surface detail in a 3D world (e.g., a 3D virtual world, which may be or include a setting for a game). These images that form surface detail may be streamed to the end user. Very small stream packets may be used to cover most of the corresponding 3D space for end users on initial start-up, which may reduce initial download sizes in representing large 3D worlds with pre-defined known camera paths.

The systems and methods may decouple surface detail from 3D model complexity by using pre-authored image projections to project high quality detail onto 3D surfaces. As used herein, "surface detail" refers to combinations of image projections in space that cover viewable 3D surfaces from in-world (e.g., in-game) camera views, which may be distinguishable from 2D textures that wrap around 3D surfaces in traditional UV-mapping methods.

The systems and methods thus may allow an art team to project any one or more images back onto 3D model surfaces and to include projections that can be as rich as film frames, feature animation frames, high end digital renders, concept paintings, or any suitable combination thereof.

In some example embodiments, the systems and methods start with a perfect pixel-to-pixel camera match from a 3D authoring tool, such as Maya® by Autodesk®, to in-world use. The exact rendered image and camera transformation used to render that image, along with the exact same geometry in the render, may be used in-game to recreate the same look in 3D from different camera perspectives. With only one image projection, many holes or gaps may be noticeable due to a lack of coverage that one projection can fill, with its boundaries and hidden surfaces behind 3D geometry not seen from that projection. Thus, more projections may be provided so as to fill the 3D surface space and thereby cover most of the surface detail viewable to the end user from different camera perspectives.

In some example embodiments, two primary projection images are used to fill in most of the surface detail (for example 80%) taken along the primary path of in-world camera traversal. Additionally, a third projection may be selected ahead of the player's motion, in order to fill in any gaps not covered by the first two projections. According to certain example embodiments, a dynamic fourth projection is created on the fly in the engine. This fourth projection may be created by taking a screen capture (e.g., of the game in progress). The current dynamic camera's transform may be stored as the fourth projection, along with the captured image, and then be used to fill in gaps that any new selected projections may not be able to cover.

Within a given 3D world, an artist may render many of these projection images with an accompanying camera transform. In general, the larger the level, the more projections that may be needed to cover the space. In a game within the 3D world, as the player traverses the space, a custom algorithm may be used to select which two primary projection images and which third projection image to use within the total set in the world, based on the world space position of the player and his or her movement direction. In the game, a separate thread may download one or more additional projections and decompress, decrypt, and inflate into memory the projection image for the application (e.g., the game) to be used before it is actually needed. This may minimize occurrences of the phenomenon of hitching, in which data is needed before it arrives.

Example embodiments of the systems and methods discussed herein may be particularly useful in games and applications that do not have very fast player movement, vast user camera control, or extreme non-linear level layouts. However, one skilled in the art will recognize that the techniques discussed herein can be used in any suitable context and environment.

Additionally, in some example embodiments, one or more projection images may be manually modified by artists post-render and distributed with one or more back-projection techniques. For example, an artist may make one or more custom changes manually to a single projection image, and those changes may be automatically propagated to any other projections that are affected by the change. Such back-projection techniques may improve consistency of projections for the same 3D surfaces, and may allow artists to modify surface detail in image projections with greater precision (e.g., only where needed), thus avoiding redundancy of effort and unnecessary modifications.

In some example embodiments, the systems and methods operate in a game having camera path trajectories and directions that are at least semi-known (e.g., a camera path constrained by a projection path through the 3D space), in which game the players (e.g., users) may have limited or no control over camera movement. Such constraints may allow further steps to be taken in 3D world decomposition in the space of image projections. Such constraints may be entirely optional, however.

Image projection may encompass all surface texture detail of any one or more objects visible from a given camera. For given known camera positions and directions, the systems and methods may pre-generate one or more projections and may stream in (e.g., download or retrieve) any one or more additional projections that may be used to span the space to account for movement of an in-world (e.g., in-game) camera in a similar direction and location. This may ensure that the surfaces in view from the in-world camera are filled by the projection data. UV mapping may hence be omitted entirely, since the projection itself represents the UV coordinates for a given camera transformation. Thus, quality of data may be increased, since the projection provides exactly what was intended from that given projection camera view, with minimal stretching or warping in UV-space. In addition, the data footprint (e.g., in a memory) may be reduced, since a relatively low number (e.g., three) of projection images may suffice to span an entire space at any single given location of the player from a given camera view. Additionally, the scene may be easier to author and modify, in the absence of UV maps to generate or limitations of surface detail on runtime hardware.

Additionally, since these projections may be represented as image clusters in 3D space, they may be easily grouped into download chunks for streaming in the background. A web browser may be configured to automatically cache packets so as to minimize any unnecessarily redundant network transfer bandwidth. This may allow for simple control of bandwidth costs. In particular, projection images may be reduced in size to balance bandwidth costs against quality of images to end users.

FIG. 1 is an interaction diagram that depicts an image projection transfer interaction between a client and server, according to some example embodiments. As shown, the client sends a request to load a level of a game (e.g., as an example of a software application running on the client), and a server receives this request. The server sends an image collection to the client, and the client stores the received image collection in an image collection cache. The client executes (e.g., plays or presents) the game using images from various collections stored in the image collection cache. During execution of the game, the client detects that the client is near the end of the available collections stored in the image collection cache, and the client sends a request for one or more additional image collections. The server responds by sending the client another image collection, which the client may then store in the image collection cache. Accordingly, the client may continue execution of the game, using images from any one or more image collections stored in the image collection cache.

Figure 2:
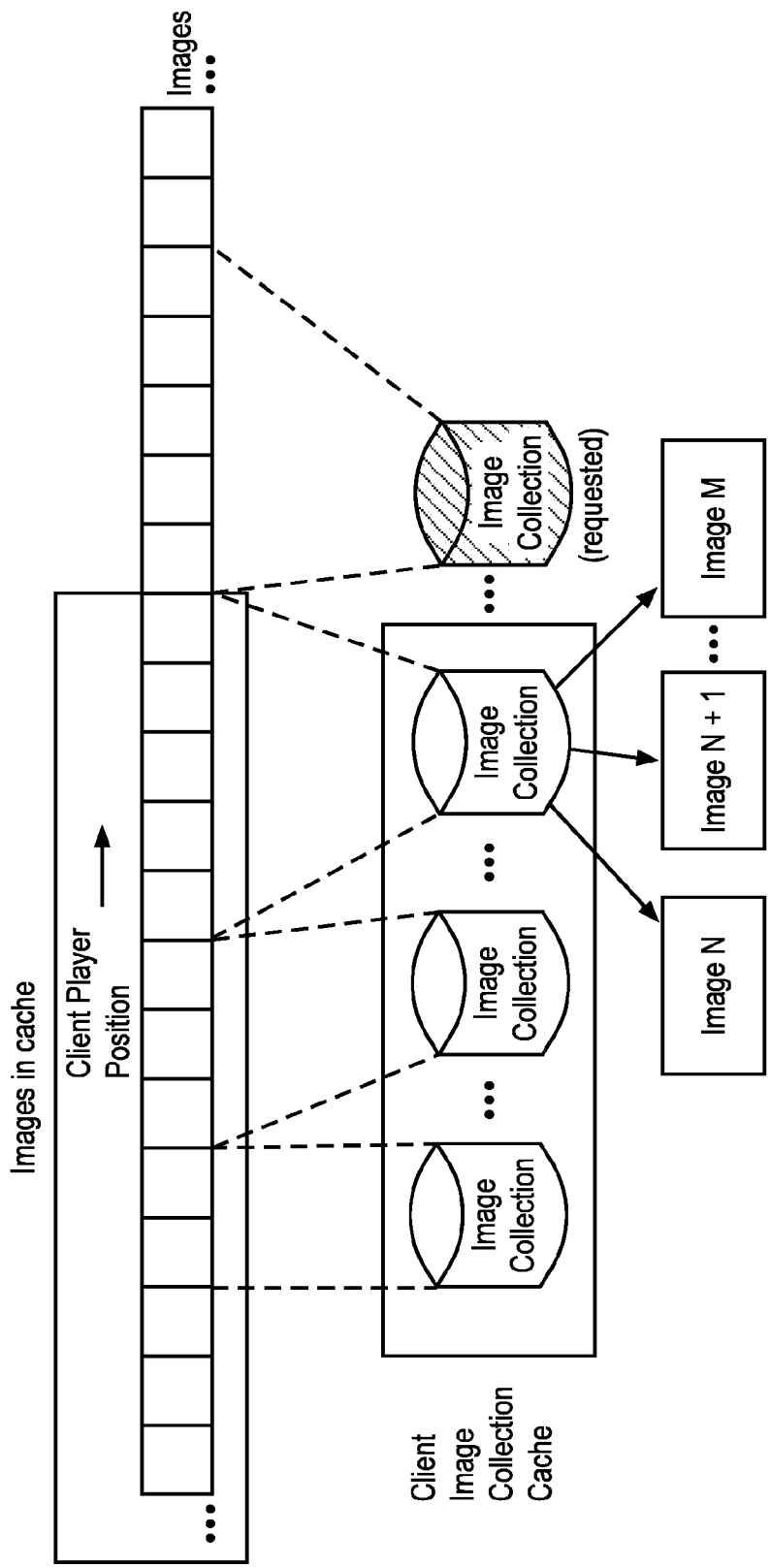
FIG. 2 is a block diagram that depicts an implementation of a client texture collection cache, according to some example embodiments.

FIG. 2 is a block diagram that depicts an implementation of a client texture collection cache, according to some example embodiments. As shown, the client stores (e.g., merges) one or more incoming image collections for the level of the game into the image collection cache until the player (e.g., a user of the client) is finished with the level of the game. That is, the client may use the image collection cache to accumulate image collections (e.g., collections of images, textures, projections, or other projectable graphics) as the player progresses in the level of the game.

Figure 3:
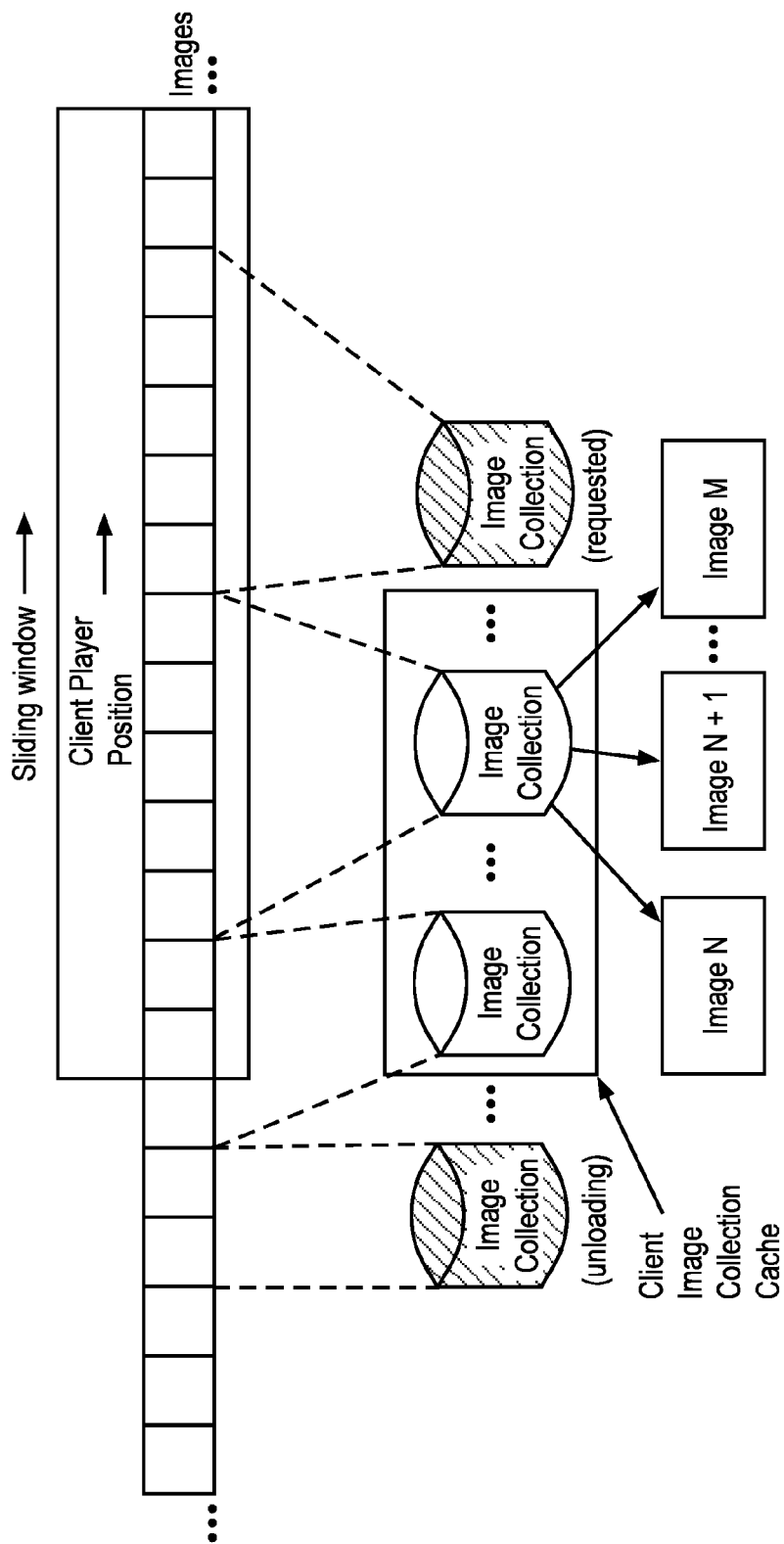
FIG. 3 is a block diagram that depicts another implementation of the client texture collection cache, according to some example embodiments.

FIG. 3 is a block diagram that depicts another implementation of the client texture collection cache, according to some example embodiments. As shown, client stores image collections based on a sliding window that is updated based on the player's progress (e.g., movement) through the level of the game. As the player progresses through the level, one or more new image collections may be requested, received, and stored, while one or more previously stored image collections may be unloaded. That is, the client may use the image collection cache to store a limited and dynamically updated subset of the image collections for the level of the game.

Figure 4:
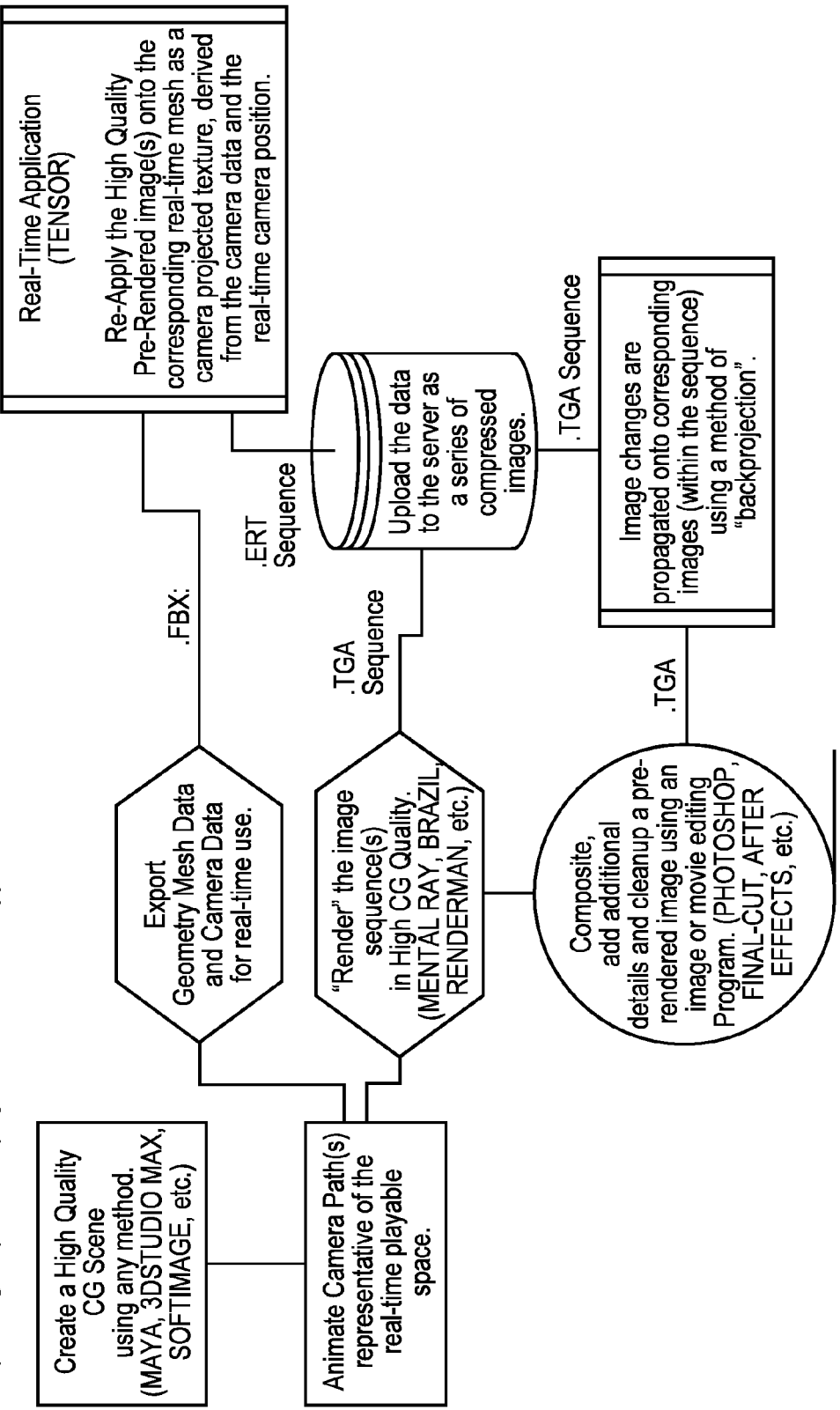
FIG. 4 is an interaction diagram depicting an artist workflow within a 3D modeling package, according to some example embodiments.

FIG. 4 is an interaction diagram depicting an artist workflow within a 3D modeling package, according to some example embodiments. Among other operations, the artist workflow may include an exporting or deployment operation (e.g., step), a compositing operation, or both. As shown, the artist workflow may begin with creation of a high-quality computer graphics (CG) scene. Next, an artist may animate one or more camera paths, and one or more of these camera paths may represent (e.g., be representative of) the playable space within a 3D game (e.g., real-time playable space).

After animation of the camera paths, the artist may export geometry mesh data, camera data, or both, for real-time use. Such data may be exported as a file (e.g., in Filmbox or .FBX format) to a real-time application.

In some example embodiments, after animation of the camera paths, the artist renders one or more image sequences (e.g., in high quality). Such rendered image sequences may be stored as one or more files (e.g., in TARGA or .TGA format) within a database of a server. For example, the file may be uploaded to a server as a series of compressed images.

In certain example embodiments, after rendering image sequences, the artist may perform additional revisions on the rendered image sequences. For example, the artist may composite one or more images together, add additional details, clean up a pre-rendered image (e.g., using an image editor or movie editor), or any suitable combination thereof. Such revised image sequences may be propagated as one or more files (e.g., in TARGA or .TGA format) that correspond to images stored within the database of the server.

In various example embodiments, the database stores one or more of the animated camera paths (e.g., as a file in Enigma binary waypoint format or .ERT format). The real-time application may access an animated camera path, the exported geometry mesh data, the exported camera data, a rendered or revised image, or any suitable combination thereof. Accordingly, the real-time application may apply (e.g., reapply) one or more rendered (e.g., pre-rendered) images onto a corresponding 3D mesh as a camera projected texture. Moreover, the camera projected texture may be derived from the camera data and the real-time camera position.

Figure 5:
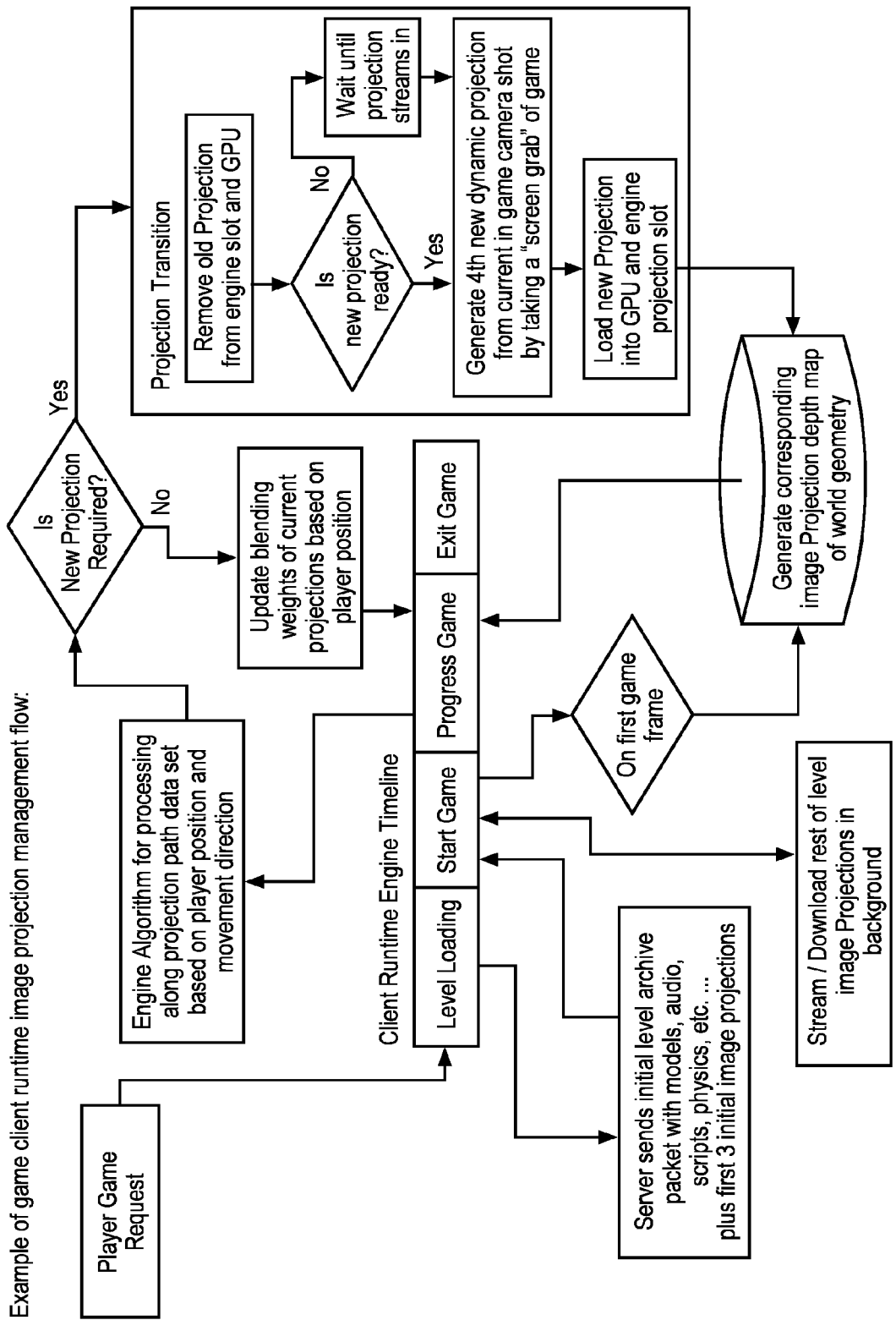
FIG. 5 is a flowchart depicting management of image projection at runtime for a game client, according some example embodiments.

FIG. 5 is a flowchart depicting management of image projection at runtime for a game client (e.g., a client device), according some example embodiments. As shown, the player game request may initiate (e.g., trigger) a loading of a level of a game. During level loading, a server (e.g., a server machine) may send an initial level archive packet that includes three models, audio, scripts, physics, and other data for starting the level of the game. This initial level archive packet may include the first initial image projections (e.g., the first three projections) for the level of the game.

After the client receives the initial level archive packet, the game client (e.g., as configured by a client runtime engine) starts the game or the level of the game. Starting and executing the game may include streaming (e.g., downloading) one or more additional image projections for the level of the game (e.g., as background processes). In some example embodiments, to generate a frame (e.g., keyframe) of the game or the level of the game (e.g., the first frame of the game or of the level), a client generates a corresponding image projection depth map of world geometry (e.g., describing a 3D virtual world in which the game is set) for the frame.

As the game progresses, the client may execute an engine algorithm (e.g., method) that tracks (e.g., calculates or determines) progress (e.g., of the player) along a projection path (e.g., a path that includes one or more line segments separating projection points that correspond to projection images or textures). The progress may be tracked based on the position of the player (e.g., player's position), the player's direction of movement (e.g., movement direction), or both.

The client (e.g., as configured by the client runtime engine, the engine algorithm, or both) may determine that obtaining a new projection is appropriate (e.g., required or expected), based on a tracked progress along the projection path. If no new projection is needed or will soon be needed, the client may update one or more blending weights for the currently used projections. Such blending weights determine the proportional influence of individual projections in generating one or more frames of the game. The updating of the blending weights may be based on the position of the player, the player's direction of movement, or both. If a new projection is needed or will soon be needed, a client may execute or initiate a projection transition algorithm to generate a frame of the game or the level of the game (e.g., by generating a corresponding image projection depth map for the frame).

According to some example embodiments, execution of the projection transition algorithm by the client begins by removing one or more old projections (e.g., from one or more occupied slots within memory managed by the client runtime engine, from a GPU of the client device, or any suitable combination thereof). The client may determine that a new projection is ready (e.g., fully downloaded and available for use). In situations where the new projection is not ready, the client may wait until the projection is streamed in (e.g., downloaded). In situations where the new projection is ready, the client may generate a new dynamic projection (e.g., a fourth projection, compared to three projections already in use). As noted above, such a dynamic projection may be generated by taking a screen capture (e.g., a screenshot or a screen grab) of the game (e.g., using the current in-game camera). After generation of the dynamic projection, the client may load the new dynamic projection into its GPU, into a slot within memory managed by the client runtime engine, or any suitable combination thereof. The game may progress in this matter until the player exits the game.

Figure 6:
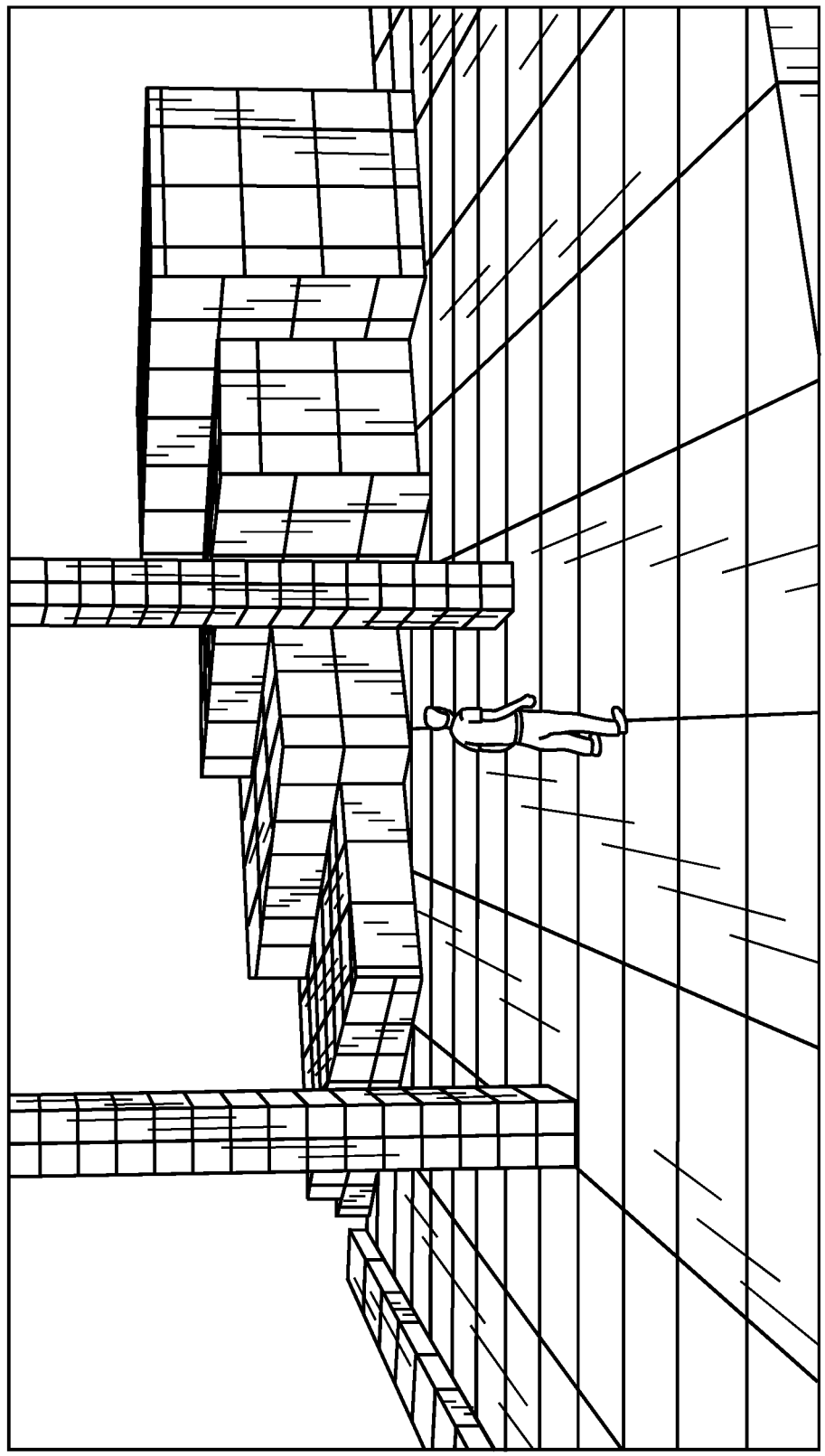
FIG. 6 is a screenshot depicting an in-game 3D multi-projection result test scene, according to some example embodiments.

FIG. 6 is a screenshot depicting an in-game 3D multi-projection result test scene generated by the systems and methods discussed herein, according to some example embodiments.

Figure 7:
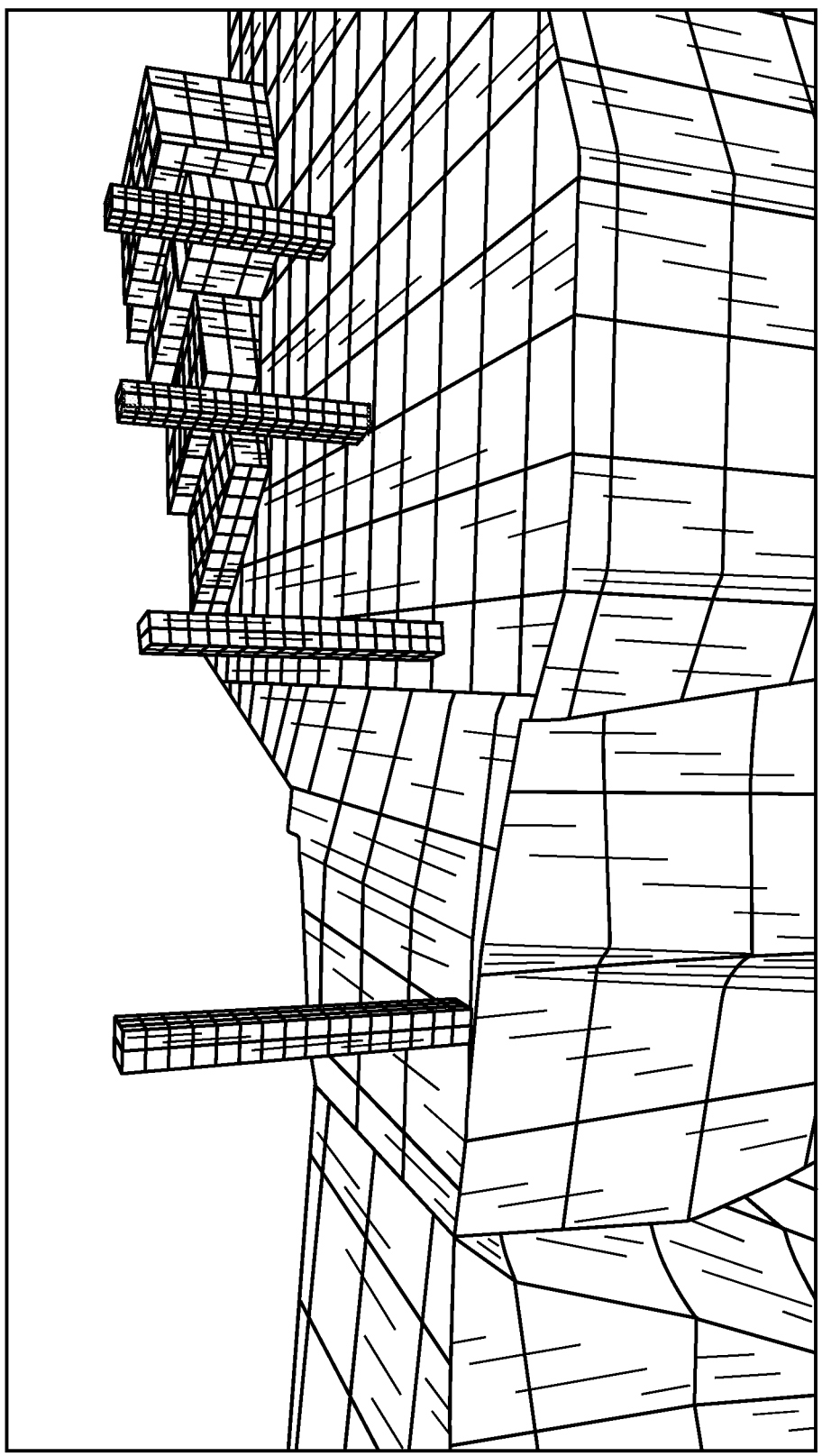
FIG. 7 is a screenshot depicting an in-game 3D multi-projection result test scene that includes a first pre-authored primary projection, according to some example embodiments.
Figure 12:
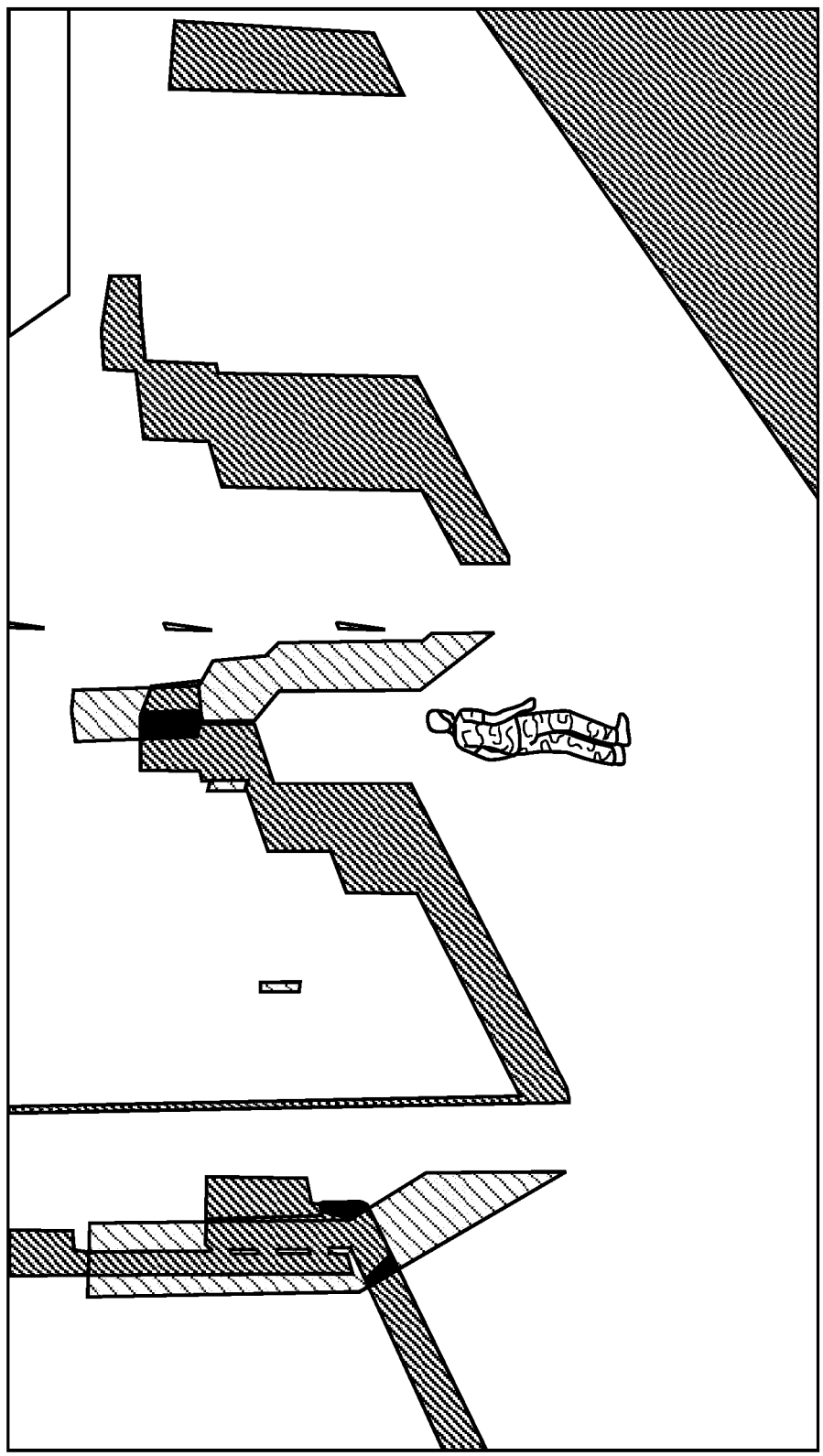
FIG. 12 is a color visualization image depicting the contributions of the first, second, and third pre-authored primary projections discussed above with respect to FIG. 7-9 and of the dynamic screen grab projection discussed above with respect to FIG. 10, according to some example embodiments.
Figure 13:
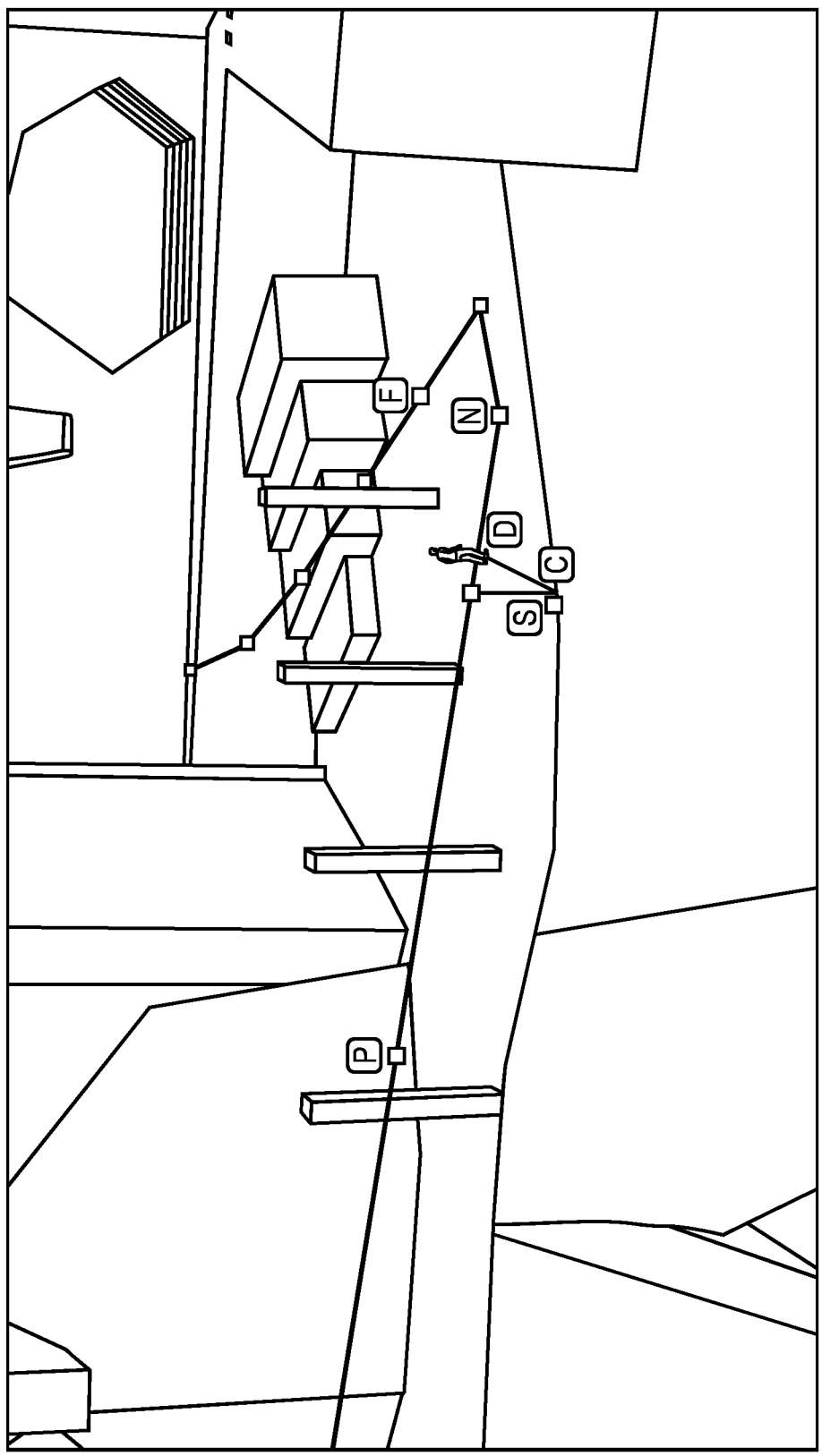
FIG. 13 is a diagram depicting a zoomed-out view of the underlying in-game 3D model surfaces shown in FIG. 6-10, according to some example embodiments.
Figure 14:
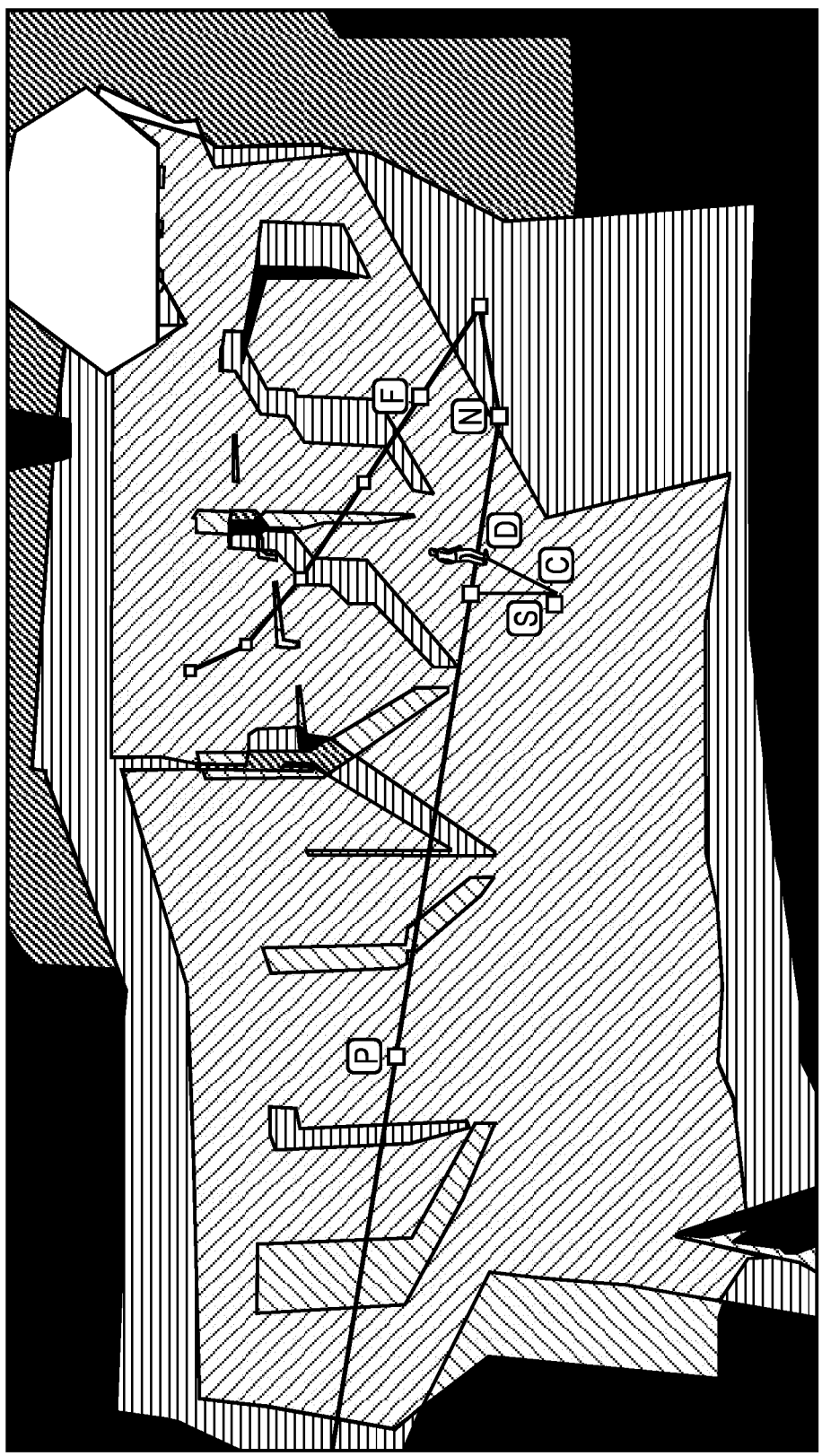
FIG. 14 is a diagram depicting a zoomed-out view of the color visualization image shown in FIG. 12, according to some example embodiments.
Figure 15:
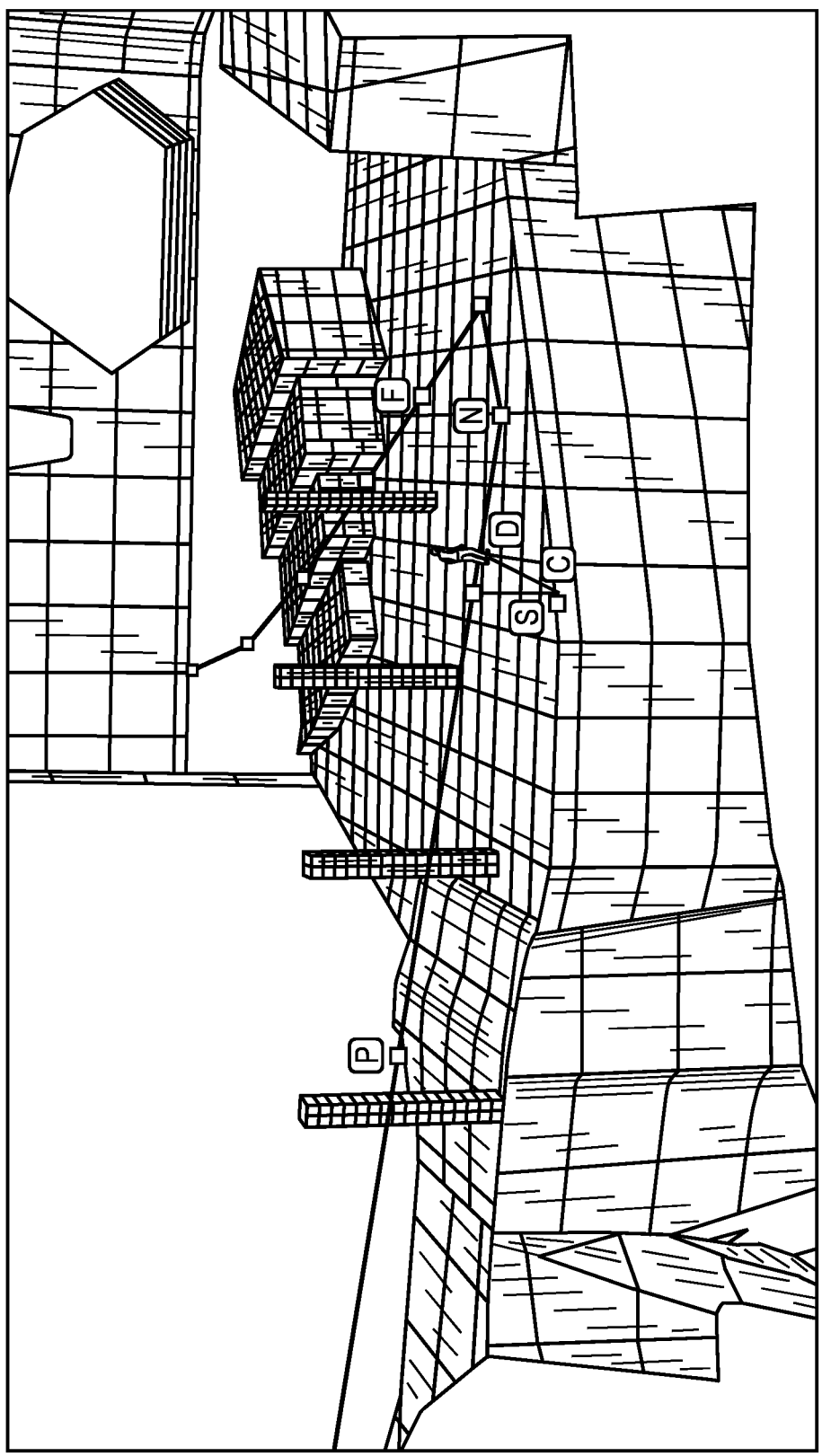
FIG. 15 is a screenshot depicting a zoomed-out view of the in-game 3D multi-projection result test scene shown in FIG. 6, according to some example embodiments.

FIG. 7 is a screenshot depicting an in-game 3D multi-projection result test scene that includes a first pre-authored primary projection, the contribution of which to the test scene shown in FIG. 6 is represented in FIG. 12 by coarse right diagonal shading. This first pre-authored primary projection is represented in FIG. 13-15 as P, the leftmost box along the projection image path in 3D space.

Figure 8:
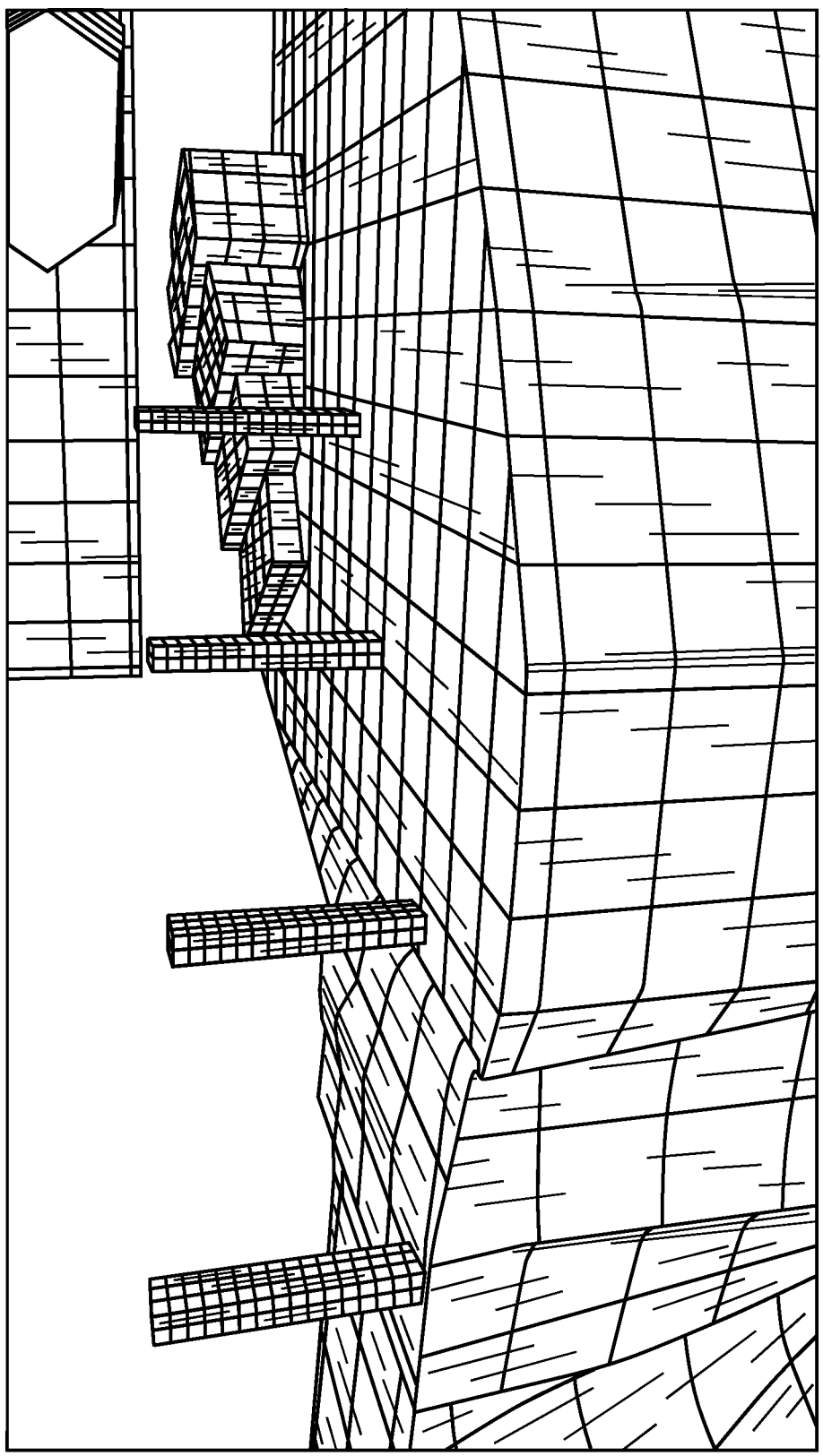
FIG. 8 is a screenshot depicting an in-game 3D multi-projection result test scene that includes a second pre-authored primary projection, according to some example embodiments.

FIG. 8 is a screenshot depicting an in-game 3D multi-projection result test scene that includes a second pre-authored primary projection, the contribution of which to the test scene shown in FIG. 6 is represented in FIG. 12 by fine right diagonal shading. This second pre-authored primary projection is represented in FIG. 13-15 as N, the second to rightmost box along the projection image path in 3D space.

Figure 9:
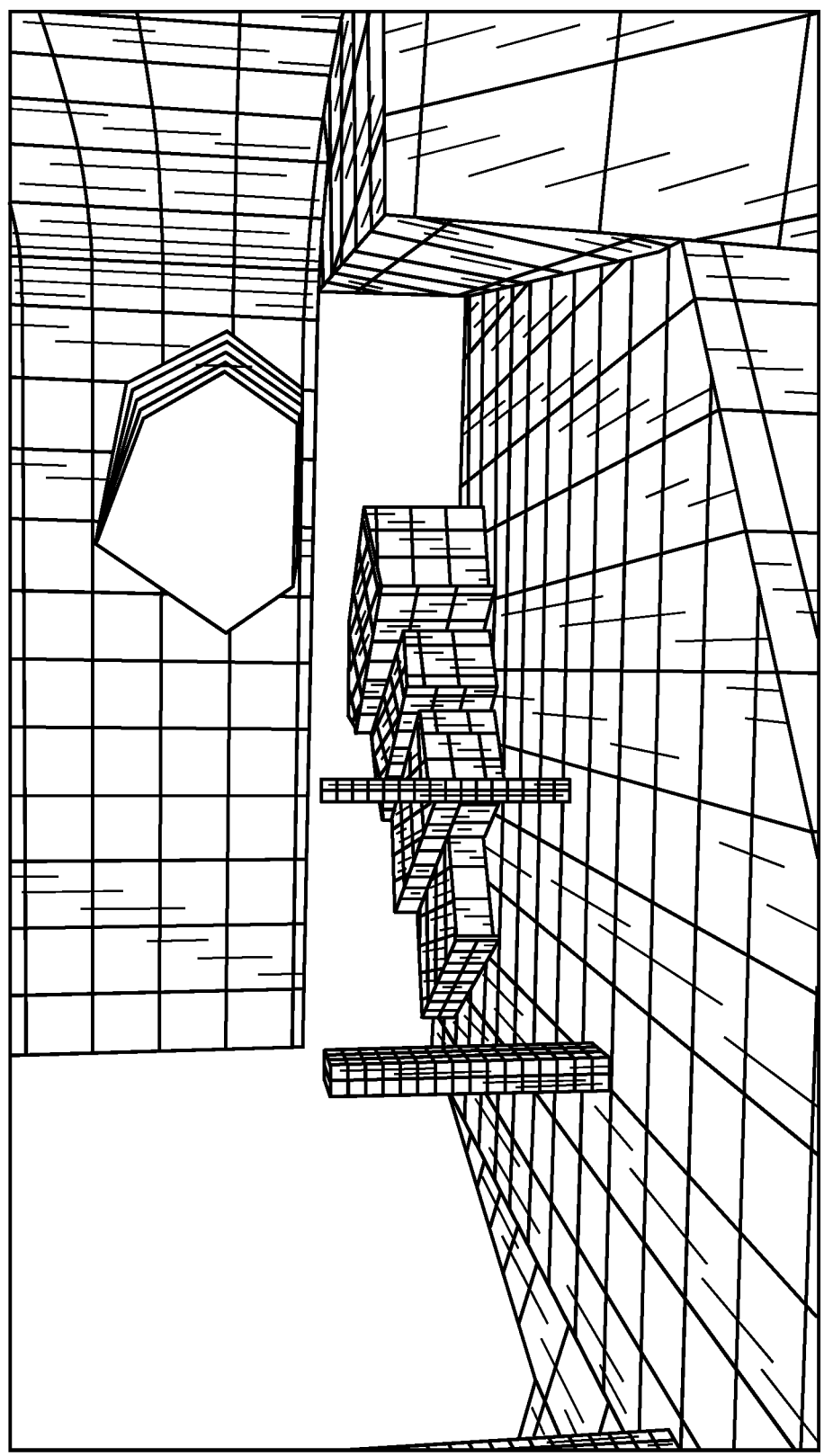
FIG. 9 is a screenshot depicting an in-game 3D multi-projection result test scene that includes a third pre-authored primary projection, according to some example embodiments.

FIG. 9 is a screenshot depicting an in-game 3D multi-projection result test scene that includes a third pre-authored primary projection, the contribution of which to the test scene shown in FIG. 6 is represented in FIG. 12 by coarse left diagonal shading. This is represented in FIG. 13-15 as F, the rightmost box along the projection image path in 3D space.

Figure 10:
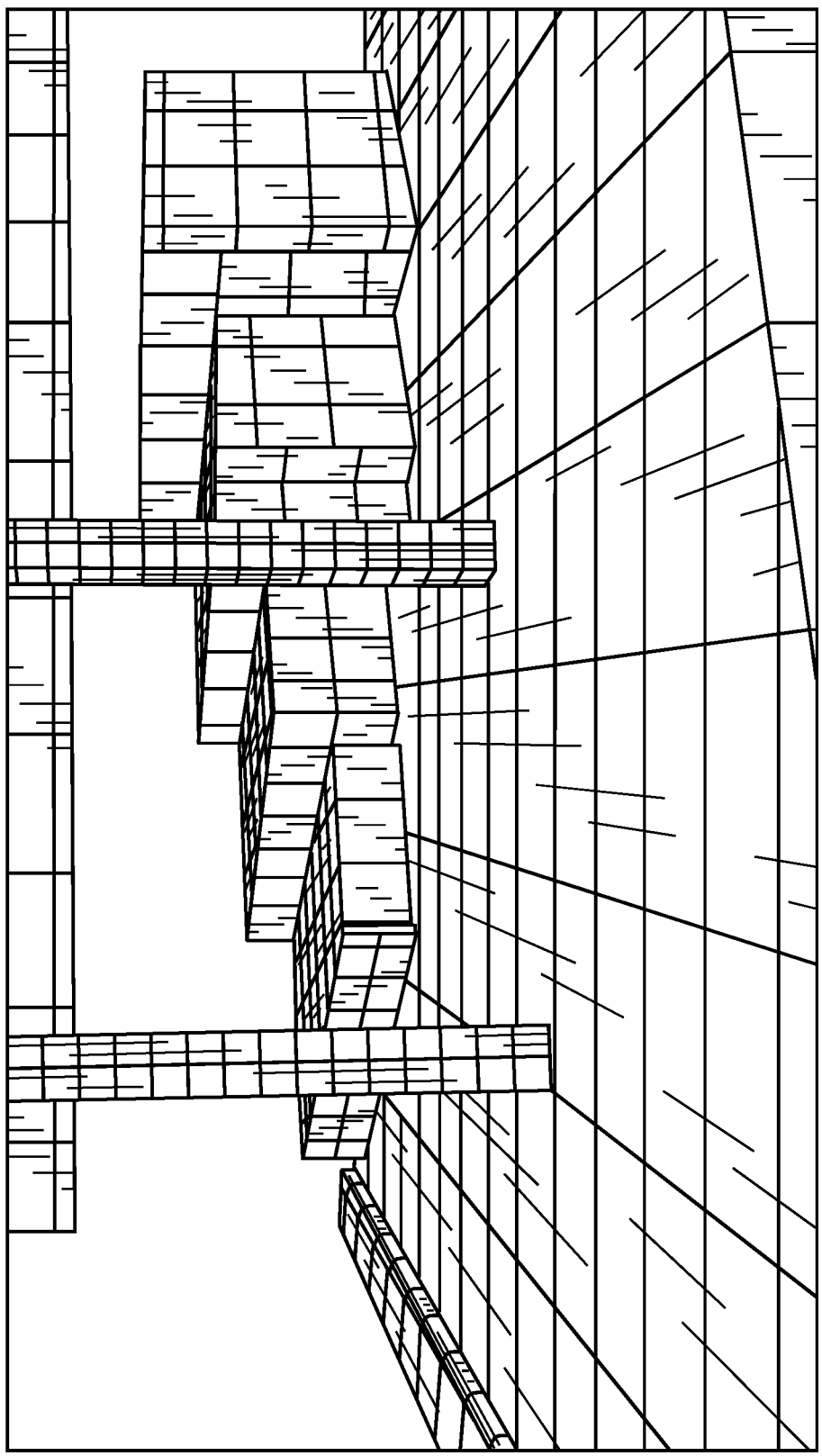
FIG. 10 is a screenshot depicting an in-game 3D multi-projection result test scene that includes a dynamic in-game screen grab projection, according to some example embodiments.

FIG. 10 is a screenshot depicting an in-game 3D multi-projection result test scene that includes a dynamic in-game screen grab projection, the contribution of which to the test scene shown in FIG. 6 is represented in FIG. 12 by solid shading. This is represented in FIG. 13-15 as S, the second leftmost box along the projection image path in 3D space.

Figure 11:
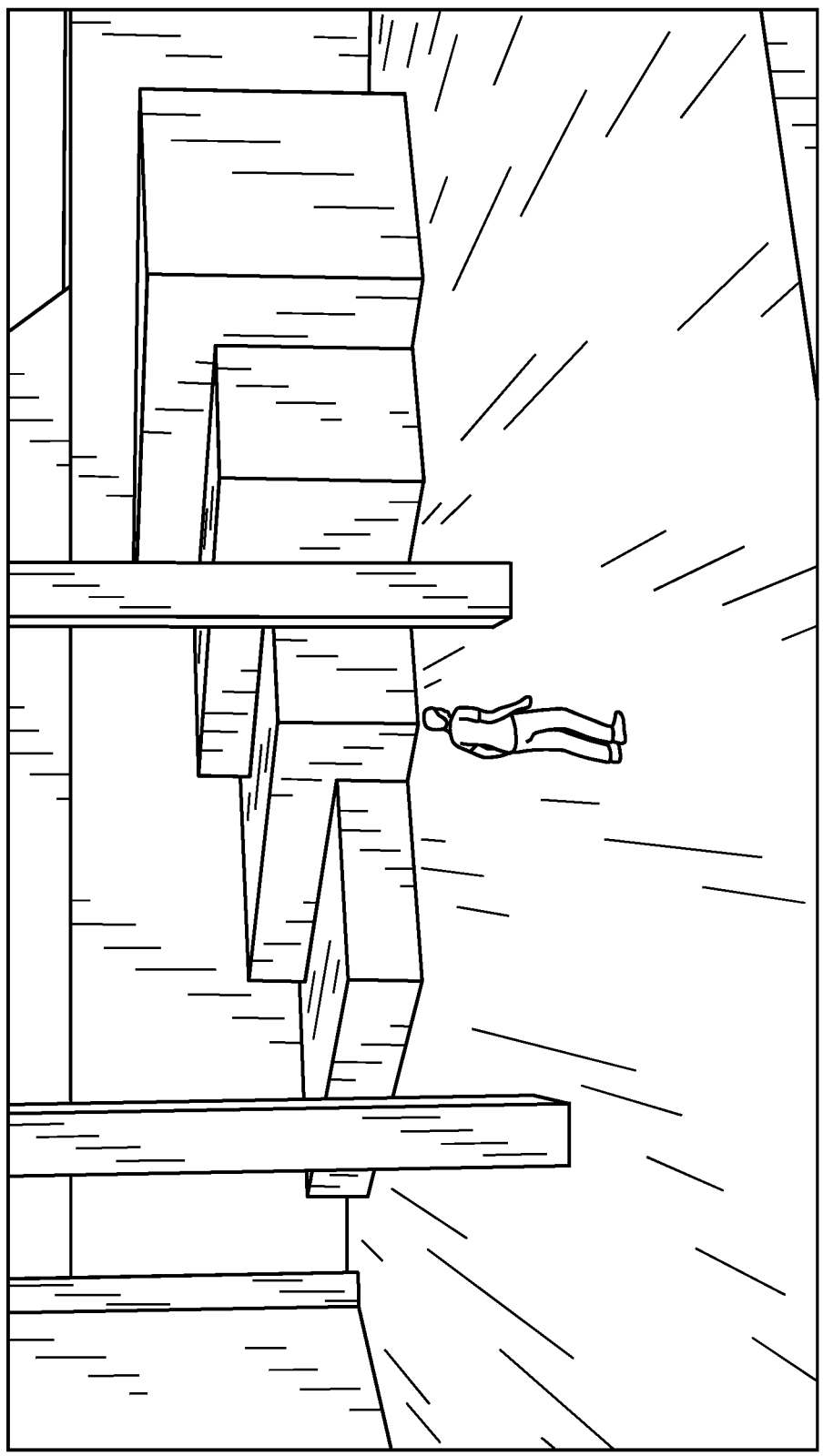
FIG. 11 is a diagram depicting the underlying in-game 3D geometry surfaces shown in FIG. 6-10, according to some example embodiments.

FIG. 11 is a diagram depicting the underlying in-game 3D geometry surfaces shown in FIG. 6-10, according to some example embodiments.

FIG. 12 is a color visualization image depicting the contributions (e.g., influences) of the first, second, and third pre-authored primary projections discussed above with respect to FIG. 7-9 and of the dynamic screen grab projection discussed above with respect to FIG. 10, according to some example embodiments. In FIG. 12, left diagonal shading shows the amount of influence contributed by projection P shown in FIG. 13-15; right diagonal shading shows the amount of influence contributed by projection N shown in FIG. 13-15; crosshatch shading shows the amount of influence contributed by projection F shown in FIG. 13-15; and dotted shading shows the amount of influence contributed by the dynamic screen grab projection S shown in FIG. 10.

FIG. 13 is a diagram depicting a zoomed-out view of the underlying in-game 3D model surfaces shown in FIG. 6-10, according to some example embodiments. Projection points P, S, N, and F are represented by boxes along a projection path. A line CD is a line segment from the in-game camera position to the player of the game. A line CS represents the closest line or distance from the line CD to the projection path. Projection point (e.g., box) S represents the current projected position between the first primary projection (e.g., projection point P) and the second primary projection (e.g., projection point N).

FIG. 14 is a diagram depicting a zoomed-out view of the color visualization image shown in FIG. 12, according to some example embodiments. As noted above, left diagonal shading shows the amount of influence contributed by projection P shown in FIG. 13-15; right diagonal shading shows the amount of influence contributed by projection N shown in FIG. 13-15; crosshatch shading shows the amount of influence contributed by projection F shown in FIG. 13-15; and dotted shading shows the amount of influence contributed by the dynamic screen grab projection S shown in FIG. 10.

FIG. 15 is a screenshot depicting a zoomed-out view of the in-game 3D multi-projection result test scene shown in FIG. 6, according to some example embodiments. FIG. 15 also depicts the projection points and projection path discussed above with respect to FIG. 13.

Figure 16:
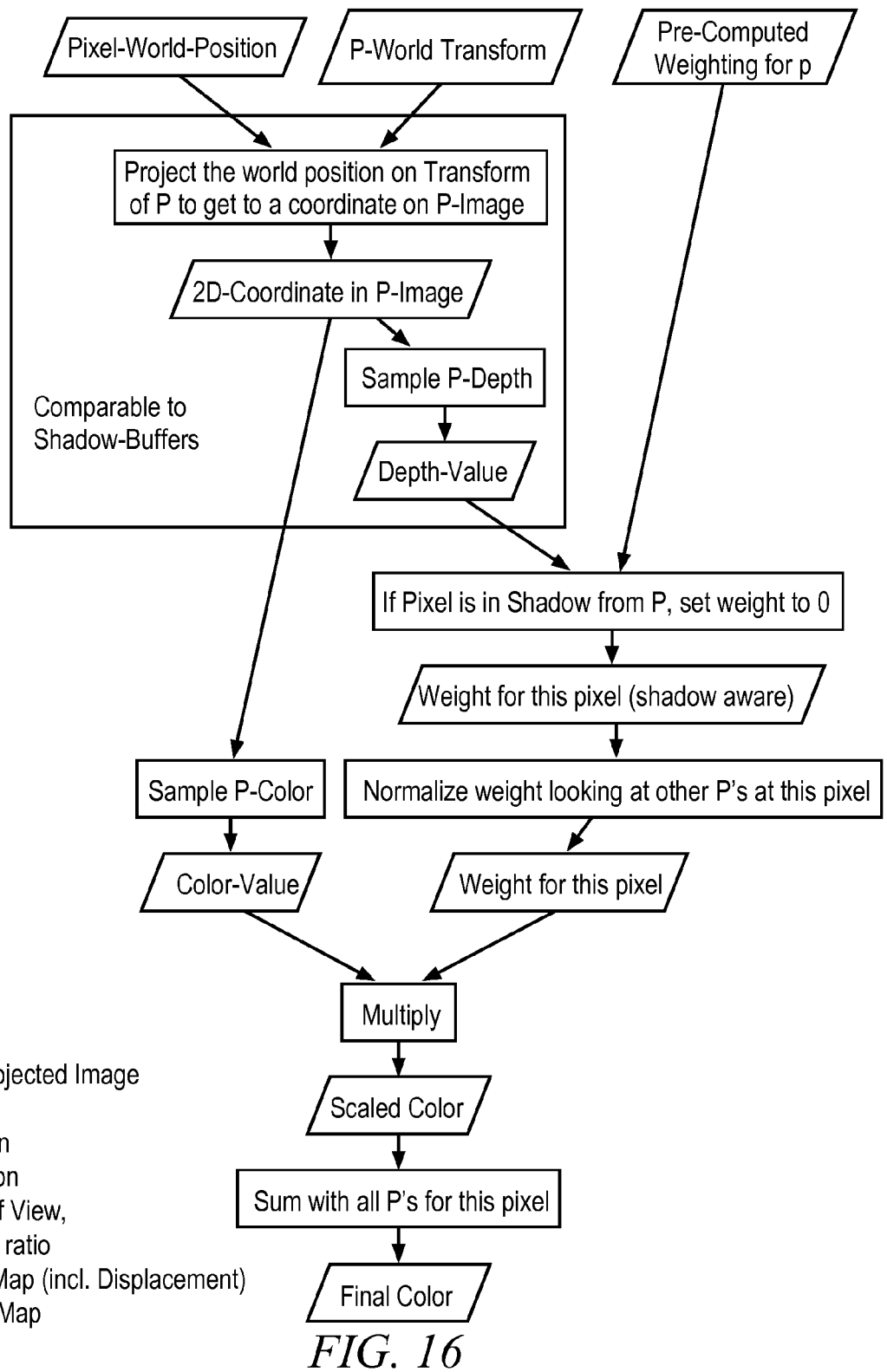
FIG. 16 is a flowchart depicting a method of core-level multi-projection combination, as applied to 3D surface fragments, according to some example embodiments.

FIG. 16 is a flowchart depicting a method of core-level multi-projection combination, as applied to 3D surface fragments, according to some example embodiments. The method may be performed, in whole or in part, by a rendering device or machine (e.g., as configured by one or more software modules). As noted in FIG. 16, a projection (e.g., a projection image or a projected image) is denoted by "P," and the projection may include information on its position in the 3D world, its direction (e.g., orientation or camera angle) in the 3D world, its field of view, its aspect ratio, its color map (e.g., a color map that includes displacement data), a depth map, or any suitable combination thereof.

The method begins with three inputs: a pixel-world-position for a projection P, a pixel-world transform for P, and a pre-computed weighting (e.g., a weight, a scalar, a multiplier, or a coefficient) for P. Based on the pixel-world-position of P and the pixel-world transform of P, a rendering device projects the pixel-world-position on the pixel-world transform and obtains a 2D coordinate on a projection-image (e.g., an image of the scene to be rendered). This 2D coordinate corresponds to a pixel to be rendered. Based on this 2D coordinate, the rendering device samples a projection-depth (e.g., from a depth map that corresponds to P) and determines a depth-value for the 2D coordinate.

Based on the depth-value and the pre-computed weighting for P, the rendering device determines a weight for the pixel that corresponds to the 2D coordinate within P. For example, if the pixel is in shadow from P (e.g., obscured within P), the weight may be set to zero. If the pixel is not in shadow, the weight may be normalized based on one or more other projections with 2D coordinates that correspond to this pixel. For example, the weight may be normalized based on one or more pre-computed weightings for such other projections.

In addition, based on the 2D coordinate obtained from projecting the pixel-world-position on the pixel-world transform, the rendering device samples a projection-color (e.g., from a color map that corresponds to P) and determines a color-value for the pixel.

Based on the normalized weight of the pixel and the color-value of the pixel, the rendering device may determine a scaled color (e.g., by multiplying the normalized weight by the color-value) for the pixel. This scaled color may be summed with scaled colors calculated similarly for one or more other projections (e.g., projections with 2D coordinates that correspond to this pixel). The result of this summation may be determined to be the final color of this pixel.

According to various example embodiments of the systems and methods discussed herein, on the first frame of each new projection assigned to be used, a depth map is created (e.g., by a rendering device or machine) by rendering all geometry from the perspective of a given projection transform (e.g., corresponding to the new projection to be used) by projection sampling on the 3D surface to determine the validity of projection color information.

In some example embodiments, up to four projection images and transformations per camera path are manually assigned (e.g., for use by a rendering device or machine). Each camera path may end when it reaches the beginning of the projection transform of the next camera path. Then, the camera path may be swapped with the next camera path, which starts from the same projection transform (e.g., so as to reduce any perceived discontinuities). This process may be repeated for one or more additional camera paths.

In certain example embodiments, an animation camera path is authored (e.g., for use by a rendering device or machine), with images rendered at intervals. A gameplay camera is positioned at a fixed offset from an in-game character (e.g., representing a player of the game), independent of projection paths. Projection paths may be designed (e.g., authored) to cover the 3D surface area with surface texture detail only. The mid-point between the character's position and the gameplay camera's position is projected to one or more line segments between two nodes in the camera projection path, so as to identify two projection nodes. Blending is performed (e.g., by the rendering device or machine) between these two projection nodes. If the player is moving forward along the projection path, then the next projection is selected as a third projection node; otherwise the previous projection node is selected as the third projection node. Transitioning from one camera path to the next may be performed (e.g., by the rendering device or machine) by incrementing or decrementing by one projection node from the current location.

In various example embodiments, a line segment is defined (e.g., calculated or determined by a rendering device or machine) between the camera position and the player position. An example of such a line segment is shown in FIG. 13-15 as line segment CD. Among all line segments in a camera projection path, the line segment nearest to CD is selected (e.g., as the current line segment), and its endpoints are defined as the previous projection node P and the next projection node N.

Based on player movement, a search may be performed (e.g., by the rendering device or machine) for a third projection node F, which may be in front of N if the player is moving forward or behind P if the player is moving backwards relative to the camera projection path. For every projection node searched, a line segment may be created (e.g., calculated or determined by the rendering device or machine) from that projection node and a predetermined distance (e.g., 10 meters) in front of (e.g., toward) the viewing direction. This line segment may be denoted as XL. The projection with the nearest XL to the line segment CD may then be selected as the third projection node F. Weightings for N and P may be computed (e.g., by the rendering device or machine) as the value of the projected distance between the line segment CD and the line segment PN. The weighting for F may be fixed at a small fraction so that the influence of F acts solely or primarily to fill in gaps missed by the primary projections P and N. Projection transitions between new P and N projection nodes may be smoothed over time (e.g., by the rendering device or machine) to reduce "popping" artifacts when projections are swapped. Additionally, in some example embodiments, during a transition between different sets of projection nodes, a screen shot may be taken in-game (e.g., by the rendering device or machine) and its corresponding camera transformation may be stored (e.g., by the rendering device or machine) to act as a fourth projection node (e.g., for fillers). This fourth projection node may be used (e.g., by the rendering device or machine) to fill in any gaps that P, N, and F do not span.

According to some example embodiments, the systems and methods discussed herein provide a mechanism for propagation of back-projection modifications. For example, if an artist changes a detail in a projection (e.g., a 3D surface location detail), a process may be run (e.g., by a rendering device or machine) that back-projects the modifications to all related projection images (e.g., all projection images that depict the detail). In this manner, the modified 3D surface detail from one projection may be represented in the same way within all other projection images that depicted the 3D surface detail. This feature may have the effect of reducing or eliminating manual modifications of many projection images at various perspective differences. Thus, this feature may facilitate a faster and easier workflow for modifying and customizing projection images (e.g., by an artist). Furthermore, this feature may reduce the amount of time spent in waiting for complex rendering to take place when generating projection images, for example, by giving full control to one or more artists to paint in detail only where desired.

According to various example embodiments of the systems and methods described herein, upon initialization of a 3D world, all 3D models, dynamic assets, animations, audio, and the like are downloaded in a single compressed and encrypted archive (e.g., into a memory of a rendering device or machine). Other example embodiments, however, are implemented differently.

In some example embodiments, only the first three projection images are initially downloaded, and play of the level begins with these three images. The remaining projections are incrementally streamed or downloaded in the background while the user is already playing the level. If the user moves too fast so that some projections are not ready when they are needed, the user's progress may be paused until the appropriate (e.g., required or expected) projections are available (e.g., fully downloaded into a memory of the rendering device or machine). Moreover, the game may be designed and paced so as to minimize or eliminate the likelihood of such an occurrence.

In certain example embodiments, an entire level may be downloaded and kept in memory (e.g., within a rendering device or machine), so as to facilitate quick transitions between projections when the user hits (e.g., reaches or views) particular points in the game (e.g., in rapid succession).

In various example embodiments, instead of downloading all remaining projection images in a level after initialization, streaming takes place in a window (e.g., a window of time or window of 3D space) around the player's current position. Thus, nearby images may be streamed in (e.g., streamed first or with high-priority), since they are more likely to be needed, while images corresponding to locations that are not near the current position can be delayed, discarded, or not loaded at all. In this manner, memory usage and bandwidth usage may be controlled (e.g., optimized), and the system (e.g., the rendering device or machine) may be accordingly scalable to accommodate larger worlds with more projections.

Returning to FIG. 16, some example embodiments of the systems and methods discussed herein may operate according to one or more of the following operations:

Core 3D projection logic (e.g., a processor of a device or machine, configured by a software module) may operate on one or more 3D surfaces within a 3D world and perform blending between or among one or more of the 3D surfaces. For a given world-space position, the 3D projection logic may compute four 2D lookup coordinates (e.g., in UV-space) that are associated with each of four projections (e.g., projection textures or projection images). The 3D projection logic may transform the world-space by one or more world-to-projection transform matrices for each projection, and scale the 2D lookup coordinates to the range 0 to 1, for texture lookup. In some example embodiments, the 3D projection logic may take perspective into account, for example, by dividing each projection's x, y, and z coordinates by w, to account for prospective projection.

The core 3D projection logic may compute a distance from a 3D pixel point to a camera position and compare the computer distance with multiple (e.g., three) projection depth maps (e.g., using the same 2D lookup coordinates discussed above) to ascertain the validity of each projection on a given 3D surface.

The core 3D projection logic may use a fourth projection (e.g., corresponding to a fourth projection node along a camera projection path) to fill at least some of the space not covered by multiple projections already in use (e.g., three projections corresponding to the projection nodes P, N, and F shown in FIG. 13-15). In some example embodiments, the core 3D projection logic omits depth testing for this fourth projection.

The 3D core projection logic may account for one or more surfaces behind a given projection, outside of its borders (e.g., outside its x and y edges), or both. Such services may be clamped to black (e.g., so that other projections may be used to fill in the resulting gaps).

The core 3D projection logic may generate a mask for valid regions of one or more surfaces for each projection. This mask may then be multiplied by one or more weightings (e.g., weights) provided by a weighting algorithm executed by the core 3D projection logic.

The core 3D projection logic may multiply each projection by a corresponding mask with one or more pre-computed weightings (e.g., weights). As noted above with respect to FIG. 16, the final color to be rendered may be determined as the total sum of all projections (e.g., on a pixel-by-pixel basis).

Some example embodiments of the systems and methods discussed herein may fully or partially implement the following algorithm (e.g., executed by a rendering device or machine) for selecting three projections from an arbitrary projection path of rendered projection transformations in 3D space.

A rendering device may compute a line segment from an in-game camera position to an in-game player position. As noted above, this line segment may be denoted as the line segment CD, similar to what is shown in FIG. 13-15.

For each line segment connecting consecutive projections along the projection path, the rendering device may determine the line segment having the closest distance to the line segment CD. This closest line segment may be designated as the "best match" line segment within the projection path, for the purpose of selecting projections.

The rendering device may designate the earliest projection node along this "best match" line segment as P and the next projection node as N, similar to what is shown FIG. 13-15. Accordingly, the projection P may be used as the "first" projection, and the projection N may be used as the "second" projection.

The rendering device may determine a current weighted blend of the two projections P and N based on the distance between the line segment CD and the line segment PN, which is part of the projection path. This weighted blend, along with a minor contribution (e.g., one or more small fixed fractions) from a third projection F, from a fourth projection S, or both, may be used by the rendering device (e.g., a shading module or shading operator within the rendering device) for rendering the 3D scene.

The rendering device may perform smoothing during player movements to reduce discontinuities (e.g., "popping") in transitions between different weightings of projections (e.g., during fast motion). In some example embodiments, within a certain tolerance, a transition to the next projection node is performed only when the player is officially close to an endpoint of the line segment PN (e.g., 90 percent of the way to an endpoint). Then, after a transition occurs, the rendering device may use smoothing to introduce lag in presenting the current weighted location along the new line segment in the projection path.

Upon beginning to use a new projection, the rendering device may determine a line segment defined in terms of a predetermined distance (e.g., 10 meters) in front of the current position of the player, if the player is moving forward. If the player is moving backward, the line segment may be defined in terms of a predetermined distance behind the current position of the player. This line segment may be determined based on the new projection's forward vector (e.g., a vector that determines a "forward" direction that corresponds to the new projection), and the determined line segment may be designated as XL, similar to what is shown in FIG. 13-15.

The rendering device may perform a line-to-line closest distance test (e.g., a test that determines the line segment that is closest to another line segment) to find the "best match" line segment (e.g., a line segment denoted as the "best fill projection match") that is closest to the line segment XL. If the player is moving forward, the rendering device may consider only projections in front of N. If the player is moving backward, the rendering device may consider only projections behind P.

The rendering device may use the "best match" line segment (e.g., line segment NF in FIG. 13-15) to determine a third projection as a "matching fill projection." For example, the projection that corresponds to the projection node F in FIG. 13-15 may be determined to be the matching fill projection.

The rendering device may weight the third projection (e.g., using a small fraction to obtain a small influence), so that the third projection only fills in gaps left by the first and second projections (e.g., the primary projections), and so that the third projection does not affect (e.g., overlap) the waiting determined for the two primary projections (e.g., the first and second projections).

The rendering device may generate and weight a fourth (e.g., dynamically generated) projection (e.g., using an even smaller fraction to obtain an even smaller influence), so that it only fills in gaps that the previous three projections do not span.

Figure 17:
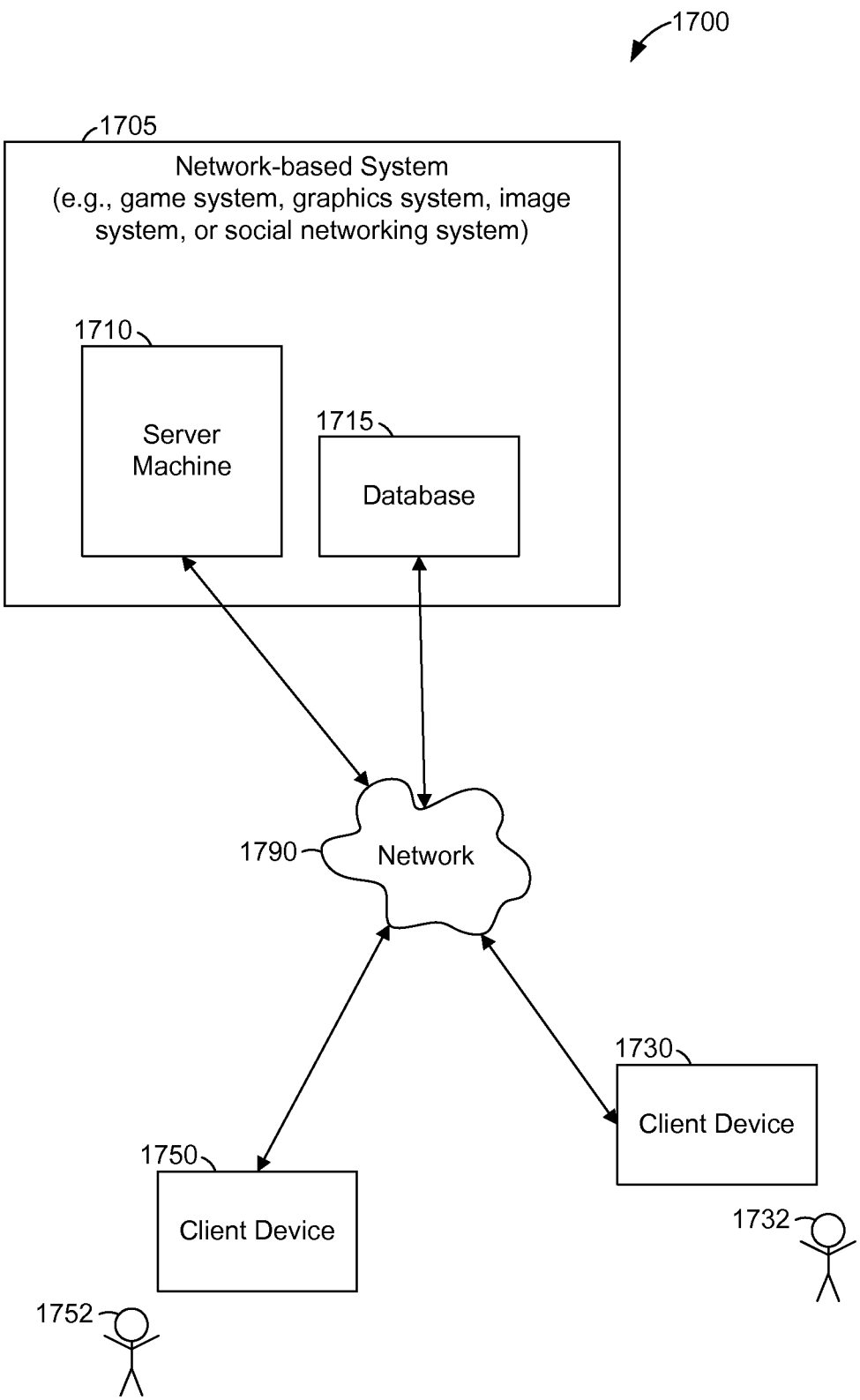
FIG. 17 is a network diagram illustrating a network environment suitable for delivery of projections for rendering and for rendering based on multiple projections, according to some example embodiments.

FIG. 17 is a network diagram illustrating a network environment 1700 suitable for delivery of projections for rendering and for rendering based on multiple projections, according to some example embodiments. The network environment 1700 includes a server machine 1710, a database 1715, and devices 1730 and 1750, all communicatively coupled to each other via a network 1790. The server machine 1710 and the devices 1730 and 1750 may each be implemented in a computer system, in whole or in part, as described below with respect to FIG. 25.

As shown, the server machine 1710, the database 1715, or both, may form all or part of a network-based system 1705. The network-based system 1705 may provide one or more network-based services (e.g., software services, computing services, gaming services, graphics services, image processing services, or social networking services) to one or more users via one or more devices that correspond to such users. For example, the network-based system 1705 may be or include a network-based game system, a network-based graphics system, a cloud-computing system, an image processing system or a social networking system.

Also shown in FIG. 17 are users 1732 and 1752. One or both of the users 1732 and 1752 may be a human user (e.g., a human being), a machine user (e.g., a computer configured by a software program to interact with the client device 1730), or any suitable combination thereof (e.g., a human assisted by a machine or a machine supervised by a human). The user 1732 is not part of the network environment 1700, but is associated with the client device 1730 and may be a user of the client device 1730. For example, the client device 1730 may be a desktop computer, a vehicle computer, a tablet computer, a navigational device, a portable media device, or a smart phone belonging to the user 1732. Likewise, the user 1752 is not part of the network environment 1700, but is associated with the client device 1750. As an example, the client device 1750 may be a desktop computer, a vehicle computer, a tablet computer, a navigational device, a portable media device, or a smart phone belonging to the user 1752.

Any of the machines, databases, or devices shown in FIG. 17 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 25. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines illustrated in FIG. 17 may be combined into a single machine, and the functions described herein for any single machine may be subdivided among multiple machines.

The network 1790 may be any network that enables communication between machines (e.g., server machine 1710 and the client device 1730). Accordingly, the network 1790 may be a wired network, a wireless network (e.g., a mobile or cellular network), or any suitable combination thereof. The network 1790 may include one or more portions that constitute a private network, a public network (e.g., the Internet), or any suitable combination thereof.

Figure 18:
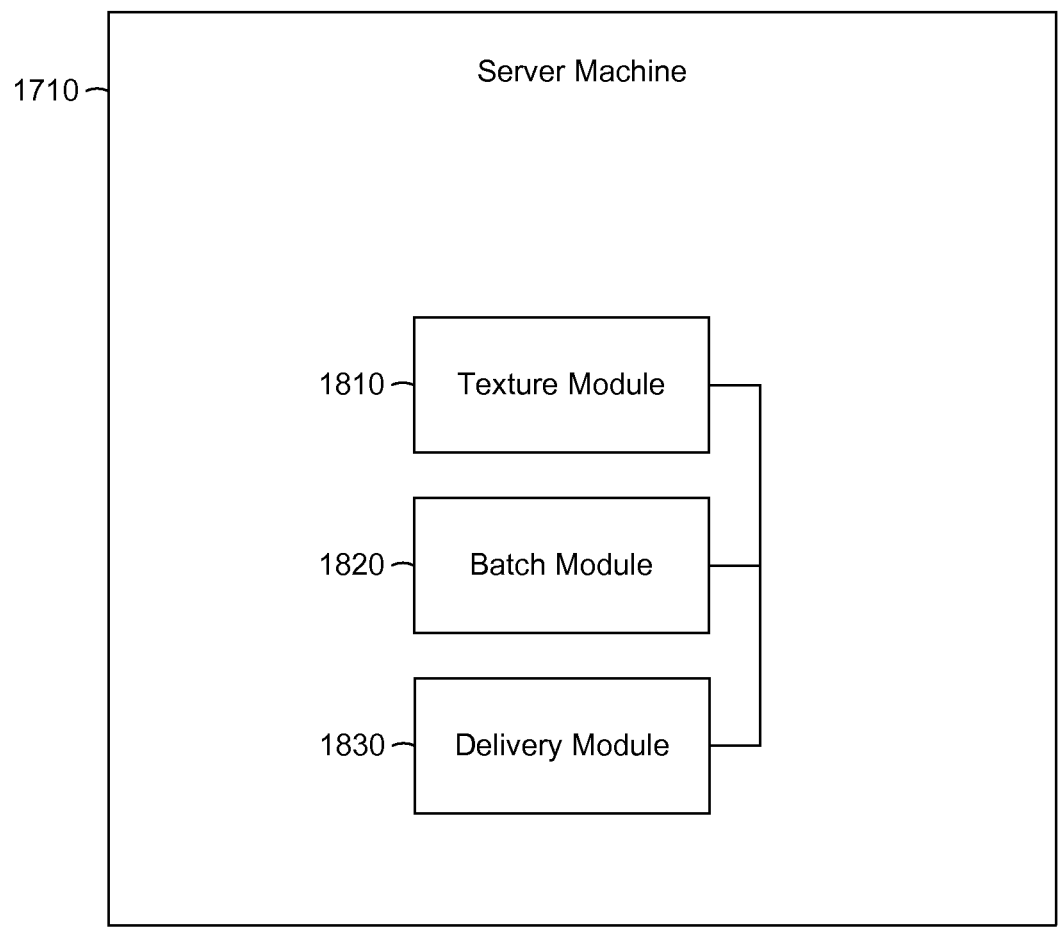
FIG. 18 is a block diagram illustrating components of a server machine suitable for delivery of projections for rendering, according to some example embodiments.

FIG. 18 is a block diagram illustrating components of the server machine 1710, according to some example embodiments. The server machine 1710 includes a texture module 1810, a batch module 1820, and a delivery module 1830, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules.

Figure 19:
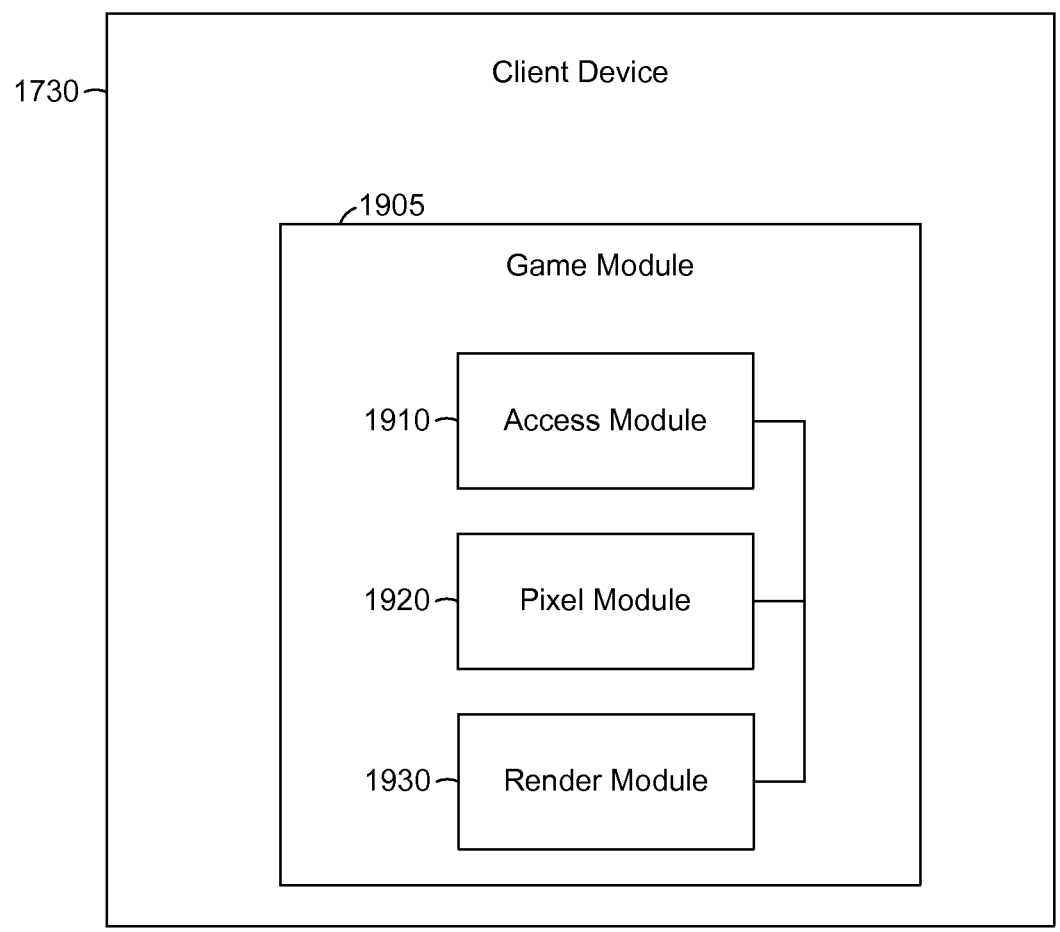
FIG. 19 is a block diagram illustrating components of a client device suitable for rendering based on multiple projections, according to some example embodiments.

FIG. 19 is a block diagram illustrating components of the client device 1730, according to some example embodiments. The client device 1730 includes an access module 1910, a pixel module 1920, and the render module 1930, all configured to communicate with each other (e.g., via a bus, shared memory, or a switch). In some example embodiments, the access module 1910, the pixel module 1920, the render module 1930, or any suitable combination thereof, may form all or part of a game module 1905 (e.g., game software, game hardware, or both) that may be executed by the client device 1730. Any one or more of these modules may be implemented using hardware (e.g., a processor of a machine) or a combination of hardware and software. As noted above, any module described herein may configure a processor to perform the operations described herein for that module. Moreover, any two or more of these modules may be combined into a single module, and the functions described herein for a single module may be subdivided among multiple modules.

Figure 20:
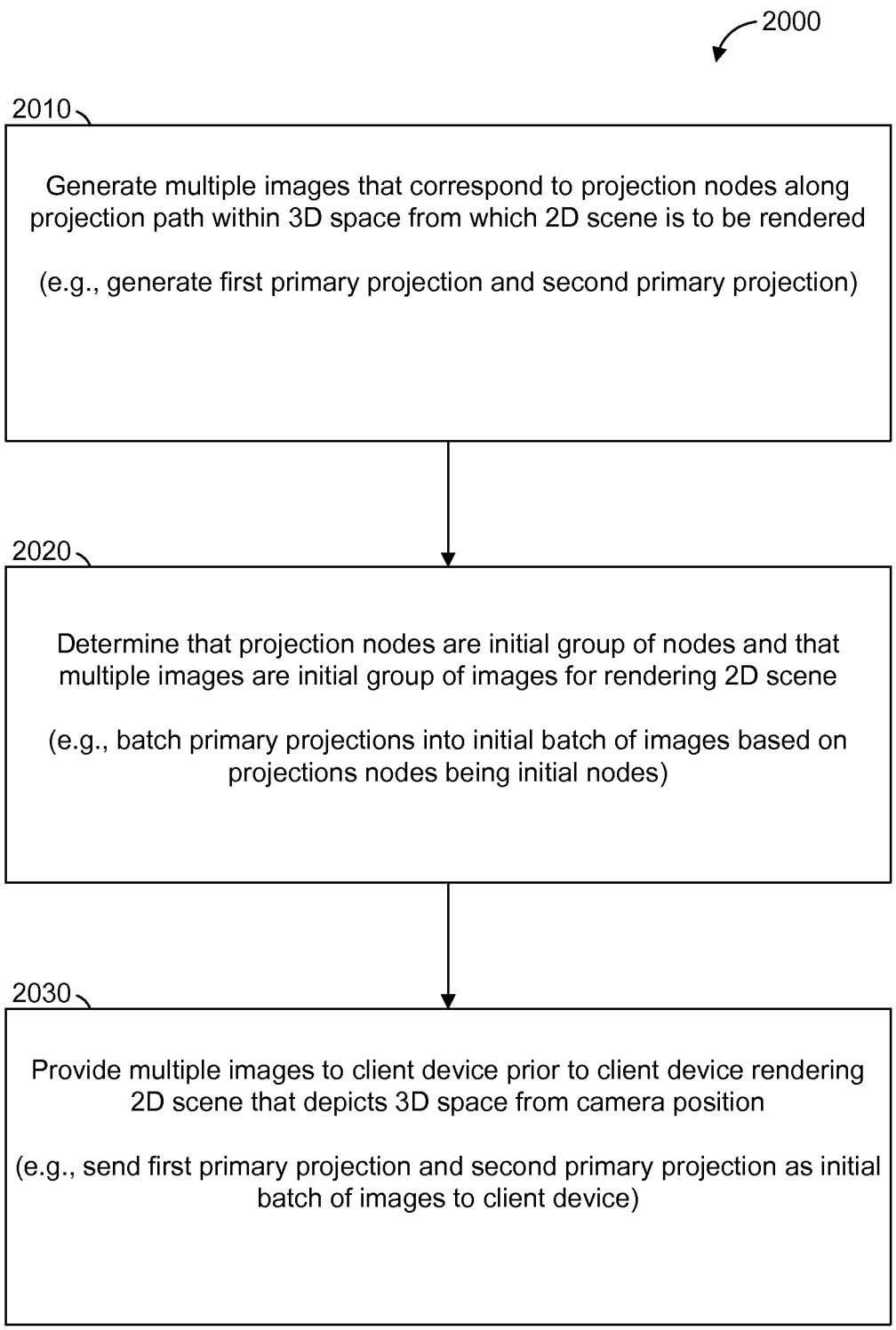
FIG. 20-21 are flowcharts illustrating operations of the server machine in performing a method of delivering projections for rendering, according to some example embodiments.
Figure 21:
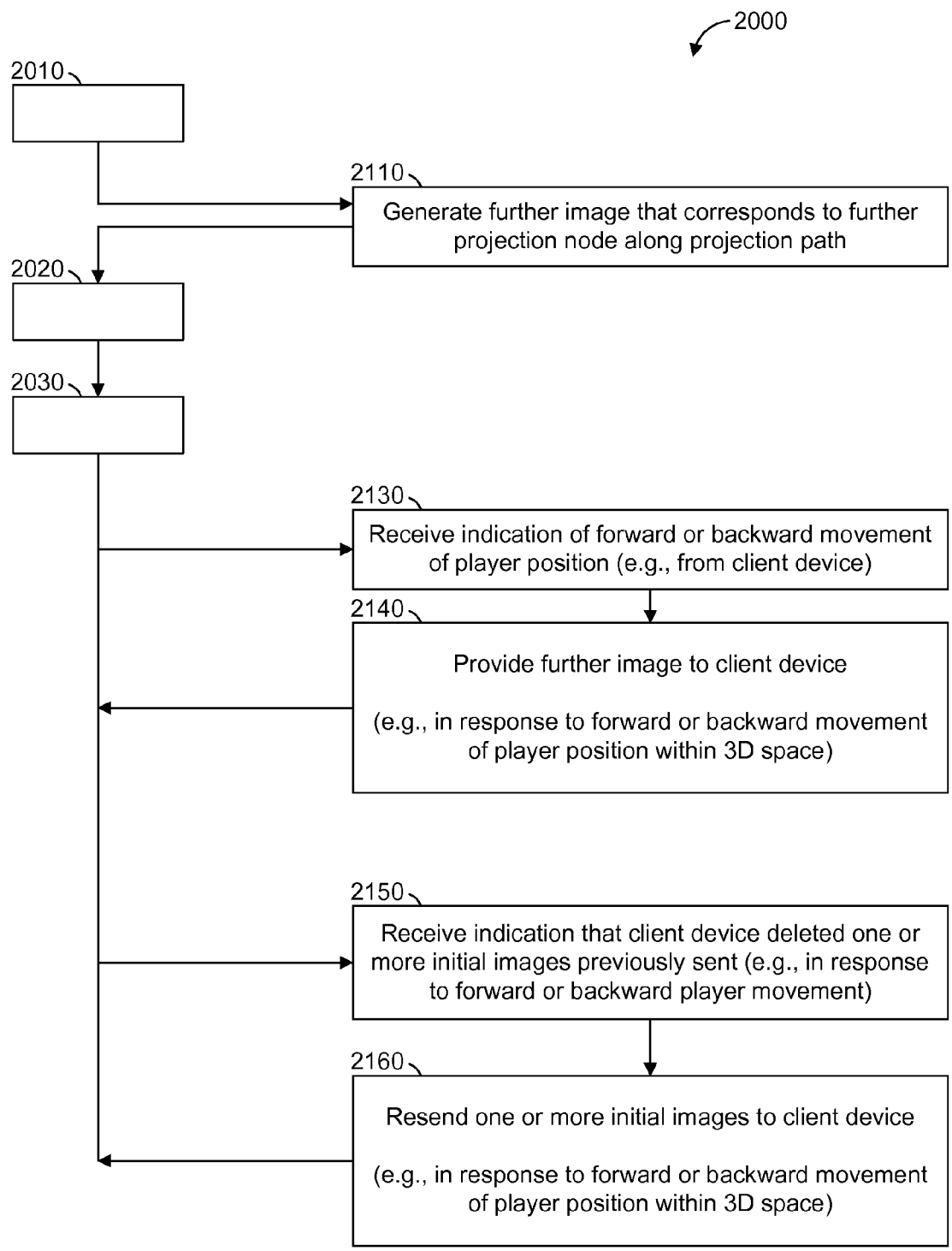

FIG. 20-21 are flowcharts illustrating operations of the server machine 1710 in performing a method 2000 of delivering projections for rendering, according to some example embodiments. Operations in the method 2000 may be performed by the server machine 1710, using modules described above with respect to FIG. 18. As shown in FIG. 20, the method 2000 includes operations 2010, 2020, and 2030.

In operation 2010, the texture module 1810 generates multiple images (e.g., projections, projection images, projected images, projection textures, or projected textures) that correspond to projection nodes along a projection path within a 3D space from which a 2D scene is to be rendered. The 2D scene, when rendered, depicts at least some of the 3D space from a camera position within the 3D space. The 3D space may be a virtual world in which a game is set. The game may be embodied in software that is executable by the client device 1730, and the game may contain one or more levels that are executable by the client device 1730. 3D space may be a setting for any one or more of such levels of the game. Each of the multiple images corresponds to one of the projection nodes. Accordingly, an image among the multiple images may be a projection that corresponds to a projection node among the projection nodes. In particular, the texture module 1810 may generate an initial group or batch of images, and this initial group or batch of images may correspond to an initial group or batch of projection nodes (e.g., the first two or three projection nodes to be used in rendering one or more initial scenes in the game or in a level thereof). In some example embodiments, additional images (e.g., projections) are generated by the texture module 1810 in the performance of operation 2010.

According to some example embodiments, the multiple images that correspond to the projection nodes include one or more primary projections. For example, the multiple images may include a first image that depicts at least some of the 3D space from a first projection node (e.g., a first camera position) along the projection path, and the multiple images may include a second image that depicts at least some of the 3D space from a second projection node (e.g., a second camera position) along the same projection path. This projection path may include the first projection node and a second projection node, as well as other projection nodes. Hence, the projection path may include a line segment on which the first projection node is an endpoint and on which the second projection node is another endpoint. This line segment may be an initial line segment at the beginning of the projection path. That is, the projection path may be or include a sequence of projection nodes, and accordingly the projection path may have a forward direction, a backward direction, or both. In certain example embodiments, the multiple images also include a third image that depicts at least some of the 3D space from a third projection node (e.g., a third camera position) along the projection path.

In operation 2020, the batch module 1820 determines that the multiple images generated in operation 2010 are an initial group or batch of images that correspond to an initial group or batch of projection nodes along the projection path. For example, the batch module 1820 may determine that the multiple images generated in operation 2010 are or include an initial group or batch of images that corresponds to an initial batch or group of projection nodes (e.g., the first two or three projection nodes to be used in the game or in the level thereof).

In operation 2030, the delivery module 1830 provides the multiple images determined in operation 2020 to the client device 1730, which may be configured to render the 2D scene based on the multiple images being provided. The providing of these multiple images may be performed before the client device 1730 renders the 2D scene that depicts at least some of the 3D space from the camera position. For example, the multiple images may be provided as part of software (e.g., a game that uses the 3D space as a setting. As another example, the multiple images may be downloaded to the client device 1730 during initialization or loading of software (e.g., a game).

In some example embodiments, the multiple images may be sent to the client device 1730 during initialization or loading of a level of a game. For example, operation 2030 may be performed in response to initiation of a level of the game by the client device 1730 (e.g., in response to the delivery module 1830 receiving an indication from the client device 1730 that such a level of the game has been initiated).

As shown in FIG. 21, the method 2000 may include one or more of operations 2110, 2130, 2140, 2150, and 2160. As shown, operation 2110 may be performed between operations 2110 and 2120. In some example embodiments, operation 2110 is performed as part of operation 2010. In operation 2110, the texture module 1810 generates a further image (e.g., a fourth projection) that corresponds to a further projection node (e.g., a fourth projection node) along the projection path within the 3D space. This further image may be provided to the client device 1730 later in the method 2000 (e.g., after performance of operation 2030 and in response to an indication of forward or backward movement of a player position within the 3D space).

As shown, one or more of operations 2130, 2140, 2150, and 2160 may be performed after operation 2030. In operation 2130, the delivery module 1830 receives an indication of forward or backward movement of a player position (e.g., a position of a player within a game being executed by the client device 1730) within the 3D space (e.g., within the virtual world that serves as a setting for the game). For example, the client device 1730 may send to the server machine 1710 an indication that the player position has moved forward with respect to the projection path (e.g., in a forward direction of the projection path or against the backward direction of the projection path). A forward direction along the projection path may be defined as a direction in which the further projection node discussed above with respect to operation 2110 succeeds (e.g., comes later in a sequence of projection nodes) the projection nodes discussed above with respect to operation 2010. As another example, the client device 1730 may send to the server machine 1710 an indication that the player position has moved backward with respect to the projection path (e.g., in a backward direction of the projection path or against the forward direction of the projection path). A backward direction along the projection path may be defined as a direction in which the further projection node discussed above with respect to operation 2110 precedes (e.g., comes earlier in a sequence of projection nodes) the projection nodes discussed above with respect to operation 2010.

In operation 2140, the delivery module 1830 provides the further image discussed above with respect to operation 2110 to the client device 1730. In some example embodiments, provision of the further image is performed in response to forward movement of a player position within the 3D space (e.g., movement in the forward direction of the projection path or against the backward direction of the projection path). In alternative example embodiments, provision of the further image is performed in response to backward movement of the player position within the 3D space (e.g., movement in the backward direction of the projection path or against the forward direction of the projection path).

According to certain example embodiments, the client device 1730 may delete (e.g., from its memory) one or more of the initial images previously provided to the client device 1730 in operation 2030. For example, the client device 1730 (e.g., as configured by game software) may maintain only those images (e.g., projections) that correspond to projection nodes within a moving window of space or time surrounding a player position within the 3D space. Hence, one or more of the multiple images provided in operation 2030 may be deleted from the client device 1730 in response to one or more movements of the player position.

In operation 2150, the delivery module 1830 receives an indication that the client device 1730 deleted an initial image (e.g., one or more of the multiple images) previously provided in operation 2030. The indication may indicate that the image previously provided was deleted in response to forward or backward movement of the player position within the 3D space.

In operation 2160, the delivery module 1830 resends the deleted image discussed above with respect to operation 2150. The resending of the deleted image may be in response to the indication received in operation 2150. Since the indication may indicate that the image was deleted in response to forward or backward movement of the player position, operation 2160 may be performed in response to the forward or backward movement of the player position within the 3D space. In some example embodiments, the deleted image is resent in response to movement in the forward direction of the projection path or against the backward direction of the projection path. In alternative example embodiments, the deleted image is resent in response to movement in the backward direction of the projection path or against the forward direction of the projection path.

Figure 22:
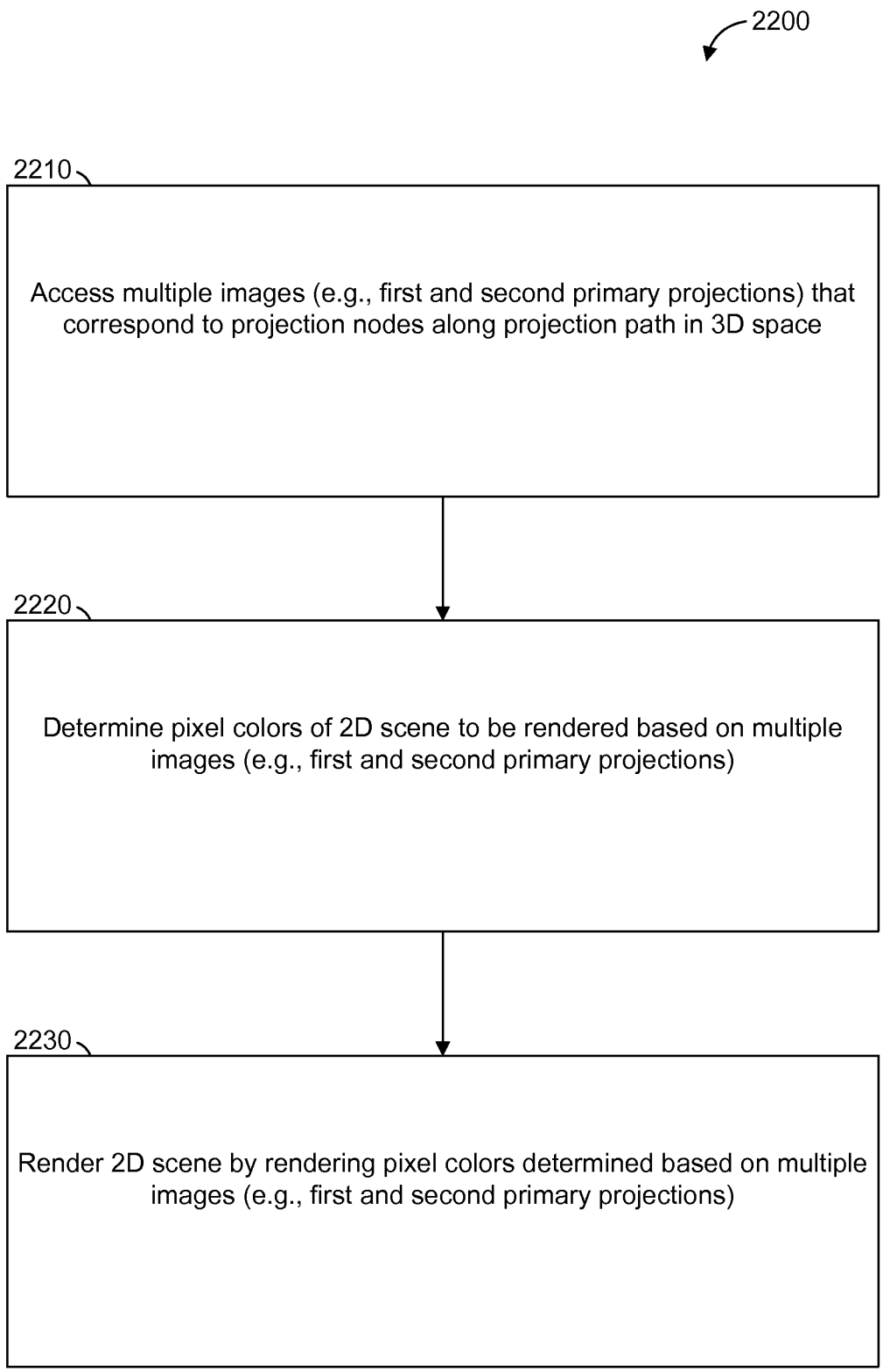
FIG. 22-24 are flowcharts illustrating operations of the client device in performing a method of rendering based on multiple projections, according to some example embodiments.
Figure 23:
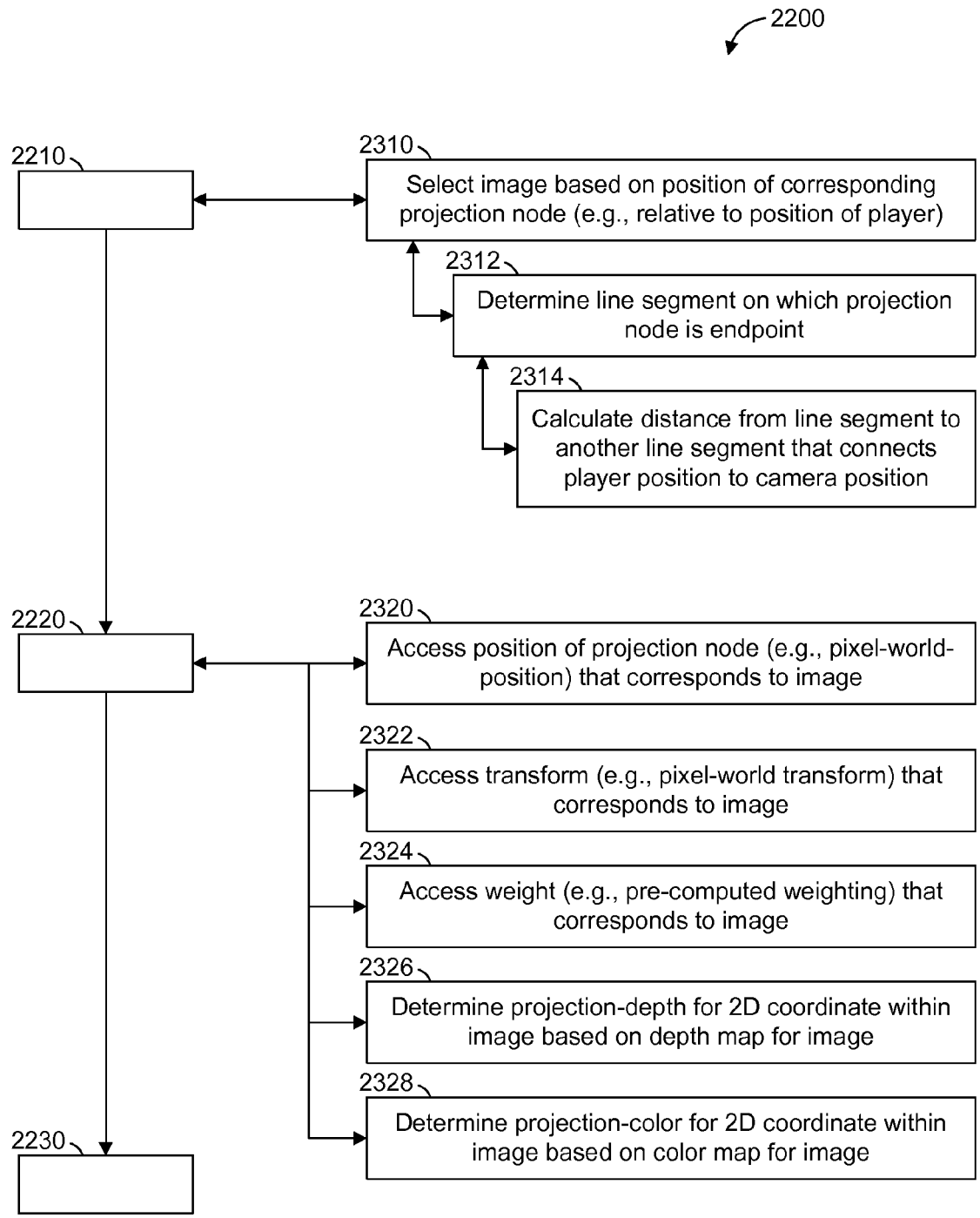
Figure 24:
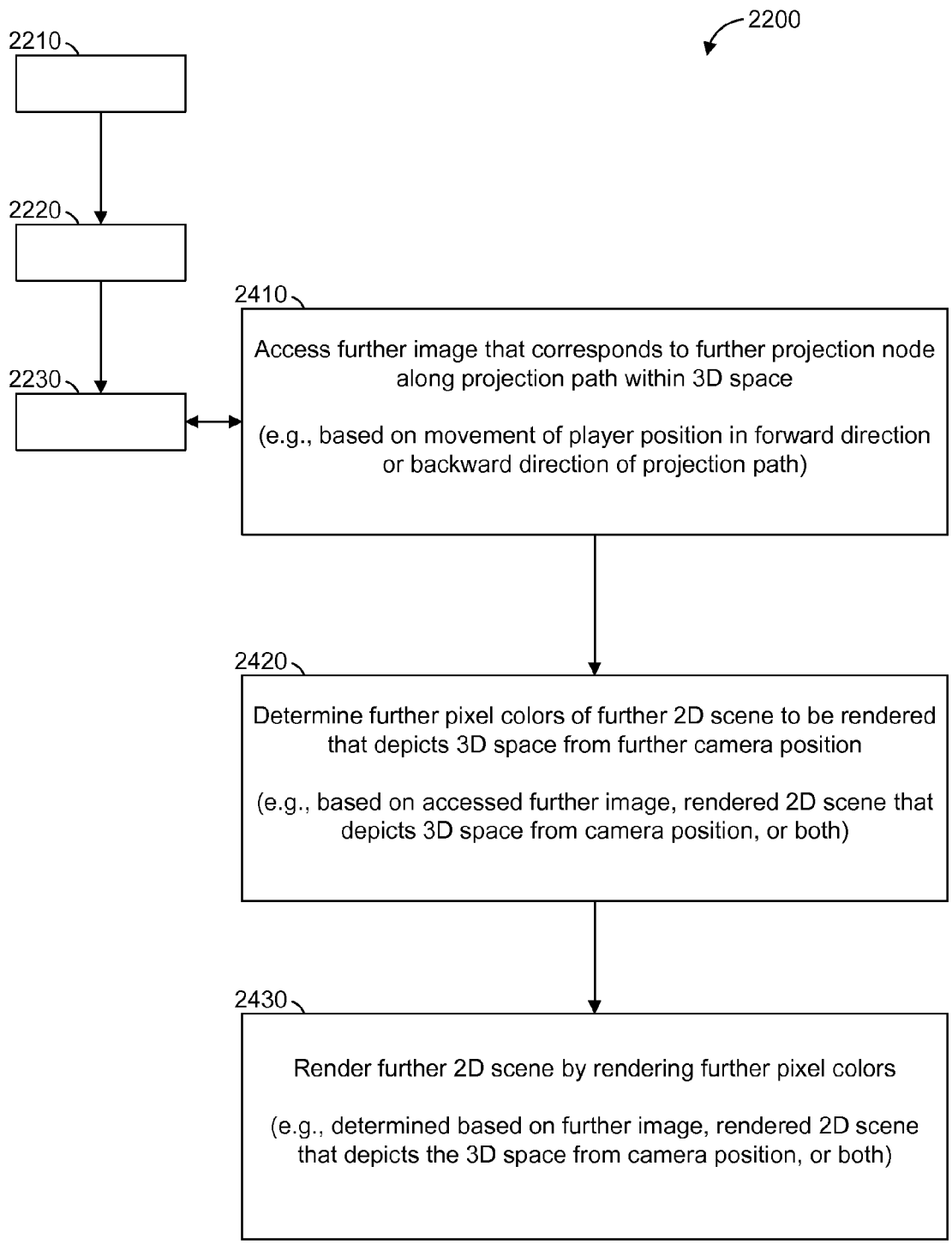

FIG. 22-24 are flowcharts illustrating operations of the client device 1730 in performing a method 2200 of rendering based on multiple projections, according to some example embodiments. Operations in the method 2200 may be performed by the client device 1730, using modules described above with respect to FIG. 19. In some example embodiments, some or all of the method 2200 may be performed by the client device 1730, the server machine 1710, or any suitable combination thereof. For example, the server machine 1710 may perform the method 2200 (e.g., using modules similar to those described above with respect to FIG. 19), and the server machine 1710 may store one or more renderings in the database 1715, communicate (e.g., deliver) one or more renderings to the client device 1730, or any suitable combination thereof. As shown in FIG. 22, the method 2200 includes operations 2210, 2220, and 2230.

In operation 2210, the access module 1910 accesses multiple images (e.g., projections, projection images, projected images, projection textures, or projected textures) that correspond to projection nodes along a projection path within the 3D space from which the 2D scene is to be rendered. The 2D scene, when rendered, depicts at least some of the 3D space from a camera position within the 3D space. The multiple images accessed in operation 2210 may be or include the multiple images discussed above with respect to operations 2010, 2020, and 2030 in the method 2000 performable by the server machine 1710. As noted above, the 3D space may be a virtual world in which a game is set. The game may be embodied in software that is executable by the client device 1730, and the game may contain one or more levels that are executable by the client device. 3D space may be a setting for any one or more of such levels of the game. Each of the multiple images corresponds to one of the projection nodes. Accordingly, an image among the multiple images may be a projection that corresponds to a projection node among the projection nodes. In certain example embodiments, the access module 1910 performs operation 2210 by accessing an initial group or batch of images (e.g., as first and second primary projections for rendering the 2D scene), and this initial group or batch of images may correspond to an initial group or batch of projection nodes (e.g., the first two projection nodes to be used in rendering one or more initial scenes in the game or in a level thereof). In some example embodiments, additional images (e.g., projections) are accessed by the access module 1910 in the performance of operation 2210.

According to some example embodiments, the multiple images that correspond to the projection nodes include one or more primary projections (e.g., a first primary projection and a second primary projection). For example, the multiple images may include a first image that depicts at least some of the 3D space from a first projection node (e.g., a first camera position) along the projection path, and the multiple images may include a second image that depicts at least some of the 3D space from a second projection node (e.g., a second camera position) along the same projection path. This projection path may include the first projection node and a second projection node, as well as other projection nodes. Hence, the projection path may include a line segment on which the first projection node is an endpoint and on which the second projection node is another endpoint. This line segment may be an initial line segment at the beginning of the projection path. That is, the projection path may be or include a sequence of projection nodes, and accordingly the projection path may have a forward direction, a backward direction, or both. In certain example embodiments, the multiple images also include a third image that depicts at least some of the 3D space from a third projection node (e.g., a third camera position) along the projection path.

In operation 2220, the pixel module 1920 determines one or more pixel colors of the 2D scene to be rendered. The determining of the pixel colors may be based on the multiple images accessed in operation 2210. As noted above, the multiple images accessed in operation 2210 may correspond to projection nodes along the projection path within the 3D space. For example, operation 2220 may be performed based on one or more primary projections (e.g., first and second primary projections) that correspond to one or more primary projection nodes that are included in the projection path. According to various example embodiments, operation 2220 may be performed using any one or more of the algorithms, techniques, and methodologies described above with respect to FIG. 1-16. For example, the determination of the pixel colors may be based on the camera position within the 3D space, a node position of a projection node among the projection nodes within the 3D space (e.g., the position of a projection node that corresponds to an image among the multiple images accessed in operation 2210), a transform (e.g., a pixel-world transform, as discussed above with respect to FIG. 16) that corresponds to the projection node (e.g., a transform of the projection node that corresponds to the image accessed in operation 2210), or any suitable combination thereof.

In operation 2230, the render module 1930 renders the 2D scene by rendering the pixel colors determined in operation 2220 (e.g., the pixel colors determined based on the one or more primary projections).

As shown in FIG. 23, the method 2200 may include one or more of operations 2310, 2312, 2314, 2320, 2322, 2324, 2326, and 2328. Operation 2310 may be performed as part (e.g., a precursor task, a subroutine, or a portion) of operation 2210, in which the access module 1910 accesses the multiple images (e.g., first and second primary projections). In operation 2310, the access module 1910 selects one or more of the multiple images based on the position of their corresponding projection nodes. That is, the selection of an image among the multiple images may be based on a node position of the projection node that corresponds to that image. For example, an image among the multiple images may be selected based on a node position of its projection node within the 3D space relative to a player position within the 3D space, where the player position may represent a user (e.g., a player) or a position thereof within the 3D space. As another example, two images among the multiple images may be selected as primary projections, and the selection of these two images may be based on the node positions of their corresponding projection nodes within the 3D space, in relation to a player position within the 3D space.

Operation 2312 may be performed as part (e.g., a precursor task, a subroutine, or a portion) of operation 2310. In operation 2312, the access module 1910 determines a line segment (e.g., line segment PN or line segment NF, shown in FIG. 13-15, along the projection path within the 3D space) on which the projection node that corresponds to the selected image is an endpoint. For example, the projection path may include multiple line segments between projection nodes, and each of these line segments may be a portion of the projection path. In performing operation 2312, the access module 1910 may determine that one of these line segments is a basis for selecting the one or more images in operation 2310. In some example embodiments, the access module 1910 determines a line segment by selecting the line segment from among multiple line segments in the projection path. One of the endpoints of this line segment may be a projection node that corresponds to an image selected in operation 2310. In some example embodiments, both endpoints of this line segment are projection nodes that correspond to images selected in operation 2310.

Operation 2314 may be performed as part (e.g., a precursor task, a subroutine, or a portion) of operation 2312. In operation 2314, the access module 1910 calculates a distance from the line segment (e.g., line segment PN or NF shown in FIG. 13-15) and another line segment that connects a player position within the 3D space to a camera position within the 3D space (e.g., line segment CD shown in FIG. 13-15). For example, as discussed above with respect to FIG. 13-15, the distance may be calculated from line segment PN to the line segment CD, and this distance may be a basis (e.g., a minimum distance) for determining that the line segment PN is a basis (e.g., a line segment whose endpoints are primary projection nodes P and N) for selecting one or more images in operation 2310.

One or more of operations 2320, 2322, 2324, 2326, and 2328 may be performed as part (e.g., a precursor task, a subroutine, or a portion) of operation 2220, in which the pixel module 1920 determines the pixel colors of the 2D scene to be rendered by the render module 1930. In operation 2320, the pixel module 1920 accesses a position (e.g., node position or pixel-world-position) of a projection node that corresponds to an image among the multiple images accessed in operation 2210. The position of the projection node may be accessed as metadata of the image. Accordingly, operation 2220 may be performed based on the position of the projection node.

In operation 2322, the pixel module 1920 accesses a transform (e.g., a node transform or pixel-world transform) that corresponds to an image among the multiple images accessed in operation 2210. The transform of the projection node may be accessed as metadata of the image. Accordingly, operation 2220 may be performed based on the transform of the projection node.

In operation 2324, the pixel module 1920 accesses a weight (e.g., a pre-computed weight or weighting) that corresponds to an image among the multiple images accessed in operation 2210. The weight may indicate an extent (e.g., degree or severity) to which the image influences the pixel colors of the 2D scene to be rendered. The pre-computed weight may be accessed as metadata of the image or may be computed by the pixel module 1920 (e.g., based on a camera position of a camera in the 3D space, a player position of a player or user in the 3D space, the node position of a projection node in the 3D space, or any suitable combination thereof). Accordingly, operation 2220 may be performed based on the weight accessed in operation 2324.

In operation 2326, the pixel module 1920 determines a projection-depth that corresponds to a 2D coordinate within an image among the multiple images accessed in operation 2210. In some example embodiments, the determining of the projection-depth is based on a depth map that corresponds to the image. Details of such a projection-depth and such a depth map are discussed above with respect to FIG. 16.

In operation 2328, the pixel module 1920 determines a projection-color that corresponds to the 2D coordinate within an image among the multiple images accessed in operation 2210. In some example embodiments, the determining of the projection color is based on a color-map that corresponds to the image. Details of such a projection-color and such a color map are discussed above with respect to FIG. 16.

As shown in FIG. 24, the method 2200 may include one or more of operations 2410, 2420, and 2430. As shown, operations 2410, 2420, and 2430 may be performed after operation 2230, in which the render module 1930 renders the 2D scene.

In operation 2410, the access module 1910 accesses another (e.g., further) image that corresponds to another projection node along the projection path within the 3D space. In some example embodiments, the projection path has a forward direction in which the further projection node succeeds the projection nodes that correspond to the multiple images accessed in operation 2210. In such example embodiments, operation 2410 may be performed in response to movement of a player position (e.g., a position that corresponds to a player or user) within the 3D space in the forward direction of the projection path. In certain example embodiments, the projection path has a backward direction in which the further projection node precedes the projection nodes that correspond to the multiple images accessed in operation 2210. In such example embodiments, operation 2410 may be performed in response to movement of the player position within the 3D space in the backward direction of the projection path.

In operation 2420, the pixel module 1920 determines further pixel colors of a further 2D scene to be rendered. The further 2D scene, when rendered, may depict at least some of the 3D space from a further camera position within the 3D space. According to various example embodiments, operation 2420 may be performed in a manner similar to that described above for operation 2220. In some example embodiments, operation 2220 is performed based on the further image accessed in operation 2410. In certain example embodiments, operation 2220 is performed based on the 2D scene rendered in operation 2230. In some example embodiments, the further image accessed in operation 2410 and the 2D scene rendered in operation 2230 are both bases for performing operation 2420.

In operation 2430, the render module 1930 renders the further 2D scene based on the further pixel colors determined in operation 2420. Operation 2430 may be performed in a manner similar to that described above for operation 2230.

According to various example embodiments, one or more of the methodologies described herein may facilitate delivery of multiple images for rendering. Moreover, one or more of the methodologies described herein may facilitate rendering based on such multiple images delivered. As noted above, one or more the methodologies described herein may facilitate rendering 2D scenes that depict 3D spaces or portions thereof, as well as improved performance in such rendering of 2D scenes.

When these effects are considered in aggregate, one or more of the methodologies described herein may obviate a need for certain efforts or resources that otherwise would be involved in rendering 2D scenes on a client device. Efforts expended by an artist in providing revised images for rendering 2D scenes that depict 3D spaces or portions thereof may be reduced by one or more of the methodologies described herein. Computing resources used by one or more machines, databases, or devices (e.g., within the network environment 1700) may similarly be reduced. Examples of such computing resources include processor cycles, network traffic, memory usage, data storage capacity, power consumption, and cooling capacity.

Figure 25:
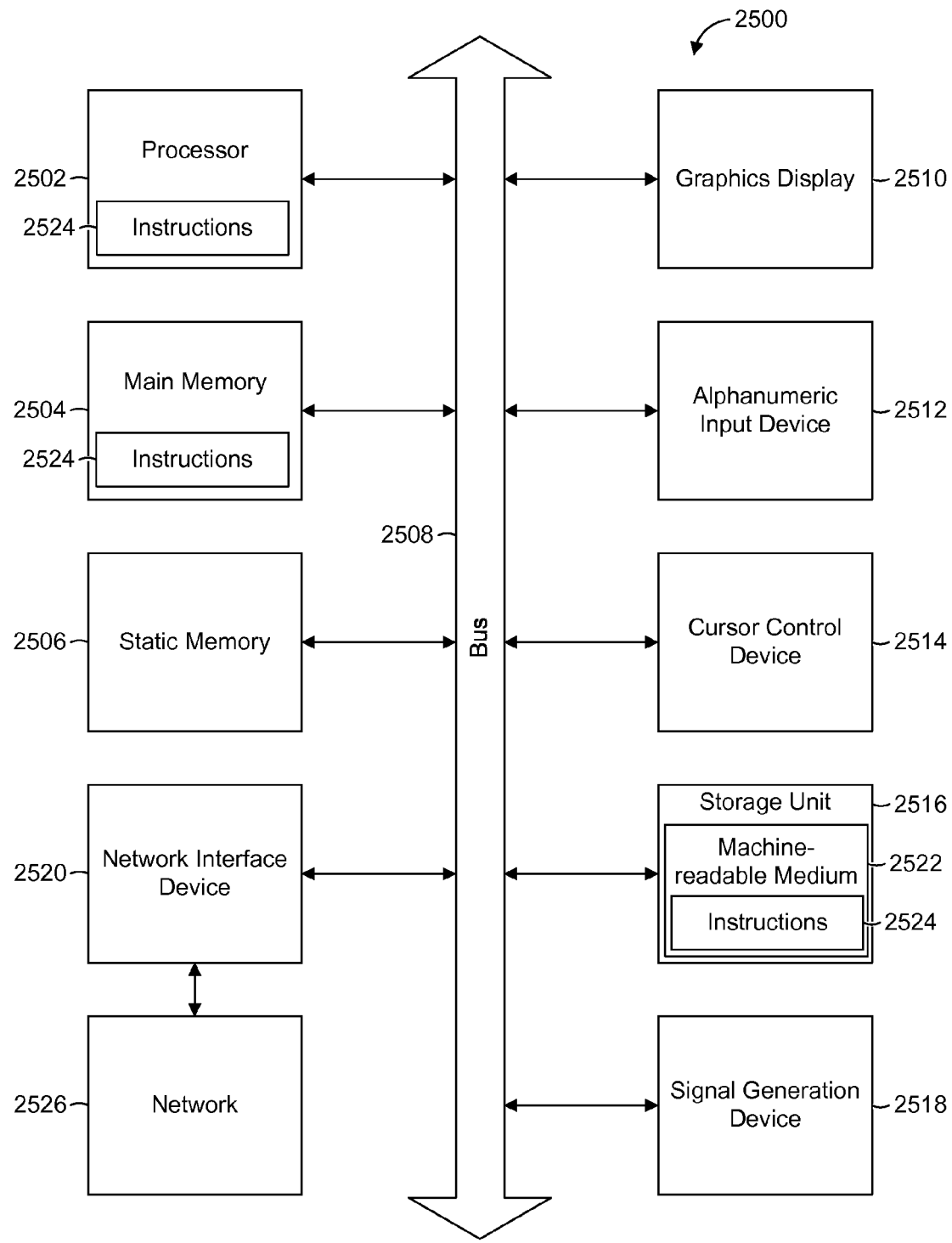
FIG. 25 is a block diagram illustrating components of a machine or device, according to some example embodiments, able to read instructions from a machine-readable medium and perform any one or more of the methodologies discussed herein.

FIG. 25 is a block diagram illustrating components of a machine 2500 (e.g., server machine 1710 or client device 1730), according to some example embodiments, able to read instructions from a machine-readable medium (e.g., a machine-readable storage medium) and perform any one or more of the methodologies discussed herein, in whole or in part. Specifically, FIG. 25 shows a diagrammatic representation of the machine 2500 in the example form of a computer system and within which instructions 2524 (e.g., software, a program, an application, an applet, an app, or other executable code) for causing the machine 2500 to perform any one or more of the methodologies discussed herein may be executed. In alternative embodiments, the machine 2500 operates as a standalone device or may be connected (e.g., networked) to other machines. In a networked deployment, the machine 2500 may operate in the capacity of a server machine or a client machine in a server-client network environment, or as a peer machine in a peer-to-peer (or distributed) network environment. The machine 2500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 2524, sequentially or otherwise, that specify actions to be taken by that machine. Further, while only a single machine is illustrated, the term "machine" shall also be taken to include a collection of machines that individually or jointly execute the instructions 2524 to perform any one or more of the methodologies discussed herein.

The machine 2500 includes a processor 2502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 2504, and a static memory 2506, which are configured to communicate with each other via a bus 2508. The machine 2500 may further include a graphics display 2510 (e.g., a plasma display panel (PDP), a light emitting diode (LED) display, a liquid crystal display (LCD), a projector, or a cathode ray tube (CRT)). The machine 2500 may also include an alphanumeric input device 2512 (e.g., a keyboard), a cursor control device 2514 (e.g., a mouse, a touchpad, a trackball, a joystick, a motion sensor, or other pointing instrument), a storage unit 2516, a signal generation device 2518 (e.g., a speaker), and a network interface device 2520.

The storage unit 2516 includes a machine-readable medium 2522 on which is stored the instructions 2524 embodying any one or more of the methodologies or functions described herein. The instructions 2524 may also reside, completely or at least partially, within the main memory 2504, within the processor 2502 (e.g., within the processor's cache memory), or both, during execution thereof by the machine 2500. Accordingly, the main memory 2504 and the processor 2502 may be considered as machine-readable media. The instructions 2524 may be transmitted or received over a network 2526 (e.g., network 1790) via the network interface device 2520.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 2522 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 2500), such that the instructions, when executed by one or more processors of the machine (e.g., processor 2502), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions define various example embodiments of methods and systems (e.g., apparatus, devices, or machines) discussed herein:

1. A method comprising:
accessing multiple images that correspond to projection nodes along a projection path within a three-dimensional (3D) space from which a two-dimensional (2D) scene that depicts at least some of the 3D space from a camera position is to be rendered;
determining pixel colors of the 2D scene that depicts at least some of the 3D space from the camera position, the pixel colors of the 2D scene being determined based on the multiple images that correspond to the projection nodes along the projection path within the 3D space, the determining of the pixel colors being performed by a processor of a machine; and
rendering the 2D scene that depicts at least some of the 3D space from the camera position by rendering the pixel colors determined based on the multiple images that correspond to the projection nodes along the projection path within the 3D space.

2. The method of description 1, wherein:
the multiple images that correspond to the projection nodes include:
a first image that depicts at least some of the 3D space from a first projection node among the projection nodes along the projection path within the 3D space, and
a second image that depicts at least some of the 3D space from a second projection node among the projection nodes along the projection path within the 3D space.

3. The method of description 1 or description 2, wherein:
the accessing of the multiple images includes selecting an image among the multiple images that corresponds to a projection node among the projection nodes,
the selecting of the image being based on a node position of the projection node within the 3D space relative to a player position that represents a user within the 3D space.

4. The method of description 3, wherein:
the selecting of the image includes determining a line segment on which the projection node that corresponds to the image is an endpoint,
the line segment being a portion of the projection path within the 3D space.

5. The method of description 4, wherein:
the determining of the line segment includes calculating a distance within the 3D space from the line segment to a further line segment that connects the player position to the camera position.

6. The method of any of descriptions 1-5, wherein:
the determining of the pixel colors of the 2D scene is based on the camera position within the 3D space, a node position of a projection node among the projection nodes that corresponds to an image among the multiple images, and a transform that corresponds to the image among the multiple images.

7. The method of description 6, wherein:
the determining of the pixel colors of the 2D scene based on the multiple images includes determining a projection-depth that corresponds to a 2D coordinate within the image that corresponds to the projection node.

8. The method of description 7, wherein:
the determining of the projection-depth is based on a depth map that corresponds to the image among the multiple images.

9. The method of description 6, wherein:
the determining of the pixel colors of the 2D scene based on the multiple images includes determining a projection-color that corresponds to a 2D coordinate within the image that corresponds to the projection node.

10. The method of description 9, wherein:
the determining of the projection-color is based on a color map that corresponds to the image among the multiple images.

11. The method of description 6, wherein:
the determining of the pixel colors of the 2D scene is based on a pre-computed weight that indicates an extent to which the image among the multiple images influences the pixel colors of the 2D scene.

12. The method of any of descriptions 1-11 further comprising:
accessing a further image that corresponds to a further projection node along the projection path within the 3D space;
determining further pixel colors of a further 2D scene that depicts at least some of the 3D space from a further camera position; and
rendering the further 2D scene that depicts at least some of the 3D space from the further camera position by rendering the further pixel colors determined based on the further image.

13. The method of description 12, wherein:
the projection path has a forward direction in which the further projection node succeeds the projection nodes along the projection path; and
the accessing of the further image is in response to movement of a player position within the 3D space in the forward direction of the projection path.

14. The method of description 12, wherein:
the projection path has a backward direction in which the further projection node precedes the projection nodes along the projection path; and
the accessing of the further image is in response to movement of a player position within the 3D space in the backward direction of the projection path.

15. The method of any of descriptions 1-14 further comprising:
determining further pixel colors of a further 2D scene that depicts at least some of the 3D space from a further camera position, the further pixel colors being determined based on the rendered 2D scene that depicts at least some of the 3D space from the camera position; and
rendering the further 2D scene that depicts at least some of the 3D space from the further camera position by rendering the further pixel colors determined based on the rendered 2D scene.

16. A non-transitory machine-readable storage medium comprising instructions that, when executed by one or more processors of a machine, cause the machine to perform operations comprising:
accessing multiple images that correspond to projection nodes along a projection path within a three-dimensional (3D) space from which a two-dimensional (2D) scene that depicts at least some of the 3D space from a camera position is to be rendered;
determining pixel colors of the 2D scene that depicts at least some of the 3D space from the camera position, the pixel colors of the 2D scene being determined based on the multiple images that correspond to the projection nodes along the projection path within the 3D space, the determining of the pixel colors being performed by the one or more processors of the machine; and
rendering the 2D scene that depicts at least some of the 3D space from the camera position by rendering the pixel colors determined based on the multiple images that correspond to the projection nodes along the projection path within the 3D space.

17. The non-transitory machine-readable storage medium of description 16, wherein the operations further comprise:
accessing a further image that corresponds to a further projection node along the projection path within the 3D space;
determining further pixel colors of a further 2D scene that depicts at least some of the 3D space from a further camera position; and
rendering the further 2D scene that depicts at least some of the 3D space from the further camera position by rendering the further pixel colors determined based on the further image.

18. The non-transitory machine-readable storage medium of description 17, wherein:
the projection path has a forward direction by which the further projection node succeeds the projection nodes along the projection path; and
the accessing of the further image is in response to movement in the forward direction of a player position within the 3D space.

19. A system comprising:
an access module configured to access multiple images that correspond to projection nodes along a projection path within a three-dimensional (3D) space from which a two-dimensional (2D) scene that depicts at least some of the 3D space from a camera position is to be rendered;
a processor configured by a pixel module to determine pixel colors of the 2D scene that depicts at least some of the 3D space from the camera position, the pixel colors of the 2D scene being determined based on the multiple images that correspond to the projection nodes along the projection path within the 3D space; and
a render module configured to render the 2D scene that depicts at least some of the 3D space from the camera position by rendering the pixel colors determined based on the multiple images that correspond to the projection nodes along the projection path within the 3D space.

20. The system of description 19, wherein:
the access module is configured to access a further image that corresponds to a further projection node along the projection path within the 3D space;
the pixel module configures the processor to determine further pixel colors of a further 2D scene that depicts at least some of the 3D space from a further camera position; and
the render module is configured to render the further 2D scene that depicts at least some of the 3D space from the further camera position by rendering the further pixel colors determined based on the further image.

21. A method comprising:
generating multiple images that correspond to projection nodes along a projection path within a three-dimensional (3D) space from which a two-dimensional (2D) scene that depicts at least some of the 3D space from a camera position is to be rendered by a client device;
determining that the projection nodes are an initial group of nodes along the projection path and that the multiple images are an initial group of images that correspond to the initial group of nodes, the determining being performed by a processor of a machine;
providing the multiple images to the client device before the client device renders the 2D scene that depicts at least some of the 3D space from the camera position based on the multiple images provided.

22. The method of description 21, wherein:
the 3D space is a virtual world in which a level of a game that is executable by the client device is set, and
the providing of the multiple images to the client device is in response to initiation of the level of the game by the client device.

23. The method of description 21 or description 22, wherein:
the multiple images that correspond to the projection nodes include:
a first image that depicts at least some of the 3D space from a first projection node among the projection nodes along the projection path within the 3D space, and
a second image that depicts at least some of the 3D space from a second projection node among the projection nodes along the projection path within the 3D space.

24. The method of description 23, wherein:
the projection path includes an initial line segment on which the first projection node that corresponds to the first image is an endpoint and on which the second projection node that corresponds to the second image is a further endpoint.

25. The method of description 24, wherein:
the multiple images that correspond to the projection nodes include:
a third image that depicts at least some of the 3D space from a third projection node among the projection nodes along the projection path within the 3D space.

26. The method of any of descriptions 21-25 further comprising:
generating a further image that corresponds to a further projection node along the projection path within the 3D space; and
providing the further image to the client device after the providing of the multiple images to the client device but prior to the client device rendering a further 2D scene that depicts at least some of the 3D space from a further camera position based on the further image provided.

27. The method of description 26, wherein:
the 3D space is a virtual world in which a game that is executable by the client device is set; and
the providing of the further image is in response to movement of a player position within the 3D space during execution of the game by the client device.

28. The method of description 27, wherein:
the projection path has a forward direction in which the further projection node succeeds the projection nodes along the projection path; and
the providing of the further image is in response to movement of the player position in the forward direction of the projection path.

29. The method of description 27, wherein:
the projection path has a backward direction in which the further projection node precedes the projection nodes along the projection path; and
the providing of the further image is in response to movement of the player position in the backward direction of the projection path.

30. The method of any of descriptions 26-29 further comprising:
resending one of the multiple images that are the initial group of images to the client device after the providing of the further image to the client device.

31. The method of description 30, wherein:
the resending is based on an indication that the client device deleted the one of the multiple images from the initial group of images.

32. The method of description 30 or description 31, wherein:
the resending is in response to movement of the player position within the 3D space during execution of the game by the client device.

33. The method of description 32, wherein:
the projection path has a forward direction in which the further projection node succeeds the projection nodes along the projection path; and
the resending is in response to movement of the player position against the forward direction of the projection path.

34. The method of description 32, wherein:
the projection path has a backward direction in which the further projection node precedes the projection nodes along the projection path; and
the resending is in response to movement of the player position against the backward direction of the projection path.

35. A non-transitory machine-readable storage medium comprising instructions that, when executed by one or more processors of a machine, cause the machine to perform operations comprising:
generating multiple images that correspond to projection nodes along a projection path within a three-dimensional (3D) space from which a two-dimensional (2D) scene that depicts at least some of the 3D space from a camera position is to be rendered by a client device;
determining that the projection nodes are an initial group of nodes along the projection path and that the multiple images are an initial group of images that correspond to the initial group of nodes, the determining being performed by the one or more processors of the machine;
providing the multiple images to the client device before the client device renders the 2D scene that depicts at least some of the 3D space from the camera position based on the multiple images provided.

36. The non-transitory machine-readable storage medium of description 35, wherein the operations further comprise:
generating a further image that corresponds to a further projection node along the projection path within the 3D space; and providing the further image to the client device after the providing of the multiple images to the client device but prior to the client device rendering a further 2D scene that depicts at least some of the 3D space from a further camera position based on the further image provided.

37. A system comprising:
a texture module configured to generate multiple images that correspond to projection nodes along a projection path within a three-dimensional (3D) space from which a two-dimensional (2D) scene that depicts at least some of the 3D space from a camera position is to be rendered by a client device;
a processor configured by a batch module to determine that the projection nodes are an initial group of nodes along the projection path and that the multiple images are an initial group of images that correspond to the initial group of nodes;
a delivery module configured to provide the multiple images to the client device before the client device renders the 2D scene that depicts at least some of the 3D space from the camera position based on the multiple images provided.

38. The system of description 37, wherein:
the 3D space is a virtual world in which a level of a game that is executable by the client device is set, and
the delivery module is configured to provide the multiple images to the client device in response to initiation of the level of the game by the client device.

39. The system of description 37 or description 38, wherein:
the texture module is configured to generate a further image that corresponds to a further projection node along the projection path within the 3D space; and
the delivery module is configured to provide the further image to the client device after the providing of the multiple images to the client device but prior to the client device rendering a further 2D scene that depicts at least some of the 3D space from a further camera position based on the further image provided.

40. The system of description 39, wherein:
the projection path has a forward direction in which the further projection node succeeds the projection nodes along the projection path; and
the delivery module is configured to provide the further image in response to movement of the player position in the forward direction of the projection path.

What is claimed is:

1. A method comprising:
accessing multiple images that correspond to projection nodes along a projection path within a three-dimensional (3D) space from which a two-dimensional (2D) scene that depicts at least some of the 3D space from a camera position is to be rendered;
determining pixel colors of the 2D scene that depicts at least some of the 3D space from the camera position, the pixel colors of the 2D scene being determined based on the multiple images that correspond to the projection nodes along the projection path within the 3D space, the determining of the pixel colors being performed by a processor of a machine;
rendering the 2D scene that depicts at least some of the 3D space from the camera position by rendering the pixel colors determined based on the multiple images that correspond to the projection nodes along the projection path within the 3D space;
accessing an additional image that corresponds to an additional projection node along the projection path within the 3D space;
determining additional pixel colors of an additional 2D scene that depicts at least some of the 3D space from an additional camera position; and
rendering the additional 2D scene that depicts at least some of the 3D space from the additional camera position by rendering the additional pixel colors.

2. The method of claim 1, wherein:
the multiple images that correspond to the projection nodes include:
a first image that depicts at least some of the 3D space from a first projection node among the projection nodes along the projection path within the 3D space, and
a second image that depicts at least some of the 3D space from a second projection node among the projection nodes along the projection path within the 3D space.

3. The method of claim 1, wherein:
the accessing of the multiple images includes selecting an image among the multiple images that corresponds to a projection node among the projection nodes,
the selecting of the image being based on a node position of the projection node within the 3D space relative to a player position that represents a user within the 3D space.

4. The method of claim 3, wherein:
the selecting of the image includes determining a line segment on which the projection node that corresponds to the image is an endpoint,
the line segment being a portion of the projection path within the 3D space.

5. The method of claim 4, wherein:
the determining of the line segment includes calculating a distance within the 3D space from the line segment to a further line segment that connects the player position to the camera position.

6. The method of claim 1, wherein:
the determining of the pixel colors of the 2D scene is based on the camera position within the 3D space, a node position of a projection node among the projection nodes that corresponds to an image among the multiple images, and a transform that corresponds to the image among the multiple images.

7. The method of claim 6, wherein:
the determining of the pixel colors of the 2D scene based on the multiple images includes determining a projection-depth that corresponds to a 2D coordinate within the image that corresponds to the projection node.

8. The method of claim 7, wherein:
the determining of the projection-depth is based on a depth map that corresponds to the image among the multiple images.

9. The method of claim 6, wherein:
the determining of the pixel colors of the 2D scene based on the multiple images includes determining a projection-color that corresponds to a 2D coordinate within the image that corresponds to the projection node.

10. The method of claim 9, wherein:
the determining of the projection-color is based on a color map that corresponds to the image among the multiple images.

11. The method of claim 6, wherein:
the determining of the pixel colors of the 2D scene is based on a pre-computed weight that indicates an extent to which the image among the multiple images influences the pixel colors of the 2D scene.

12. The method of claim 1 wherein the additional image is accessed based on a positioning of the additional projection node relative to a player position that represents a user within the 3D space.

13. The method of claim 12, wherein:
the projection path has a forward direction in which the additional projection node succeeds the projection nodes along the projection path; and
the accessing of the additional image is in response to movement of the player position within the 3D space in the forward direction of the projection path.

14. The method of claim 12, wherein:
the projection path has a backward direction in which the additional projection node precedes the projection nodes along the projection path; and
the accessing of the additional image is in response to movement of the player position within the 3D space in the backward direction of the projection path.

15. The method of claim 1 wherein the determining of the further pixel colors is based on the rendered 2D scene that depicts at least some of the 3D space from the camera position.

16. A non-transitory machine-readable storage medium comprising instructions that, when executed by one or more processors of a machine, cause the machine to perform operations comprising:
accessing multiple images that correspond to projection nodes along a projection path within a three-dimensional (3D) space from which a two-dimensional (2D) scene that depicts at least some of the 3D space from a camera position is to be rendered;
determining pixel colors of the 2D scene that depicts at least some of the 3D space from the camera position, the pixel colors of the 2D scene being determined based on the multiple images that correspond to the projection nodes along the projection path within the 3D space, the determining of the pixel colors being performed by the one or more processors of the machine;
rendering the 2D scene that depicts at least some of the 3D space from the camera position by rendering the pixel colors determined based on the multiple images that correspond to the projection nodes along the projection path within the 3D space;
accessing an additional image that corresponds to an additional projection node along the projection path within the 3D space;
determining additional pixel colors of an additional 2D scene that depicts at least some of the 3D space from an additional camera position; and
rendering the additional 2D scene that depicts at least some of the 3D space from the additional camera position by rendering the additional pixel colors.

17. The non-transitory machine-readable storage medium of claim 16, wherein the
the additional image is accessed based on a positioning of the additional projection node relative to a player position that represents a user within the 3D space.

18. The non-transitory machine-readable storage medium of claim 17, wherein:
the projection path has a forward direction by which the additional projection node succeeds the projection nodes along the projection path; and
the accessing of the additional image is in response to movement in the forward direction of the player position within the 3D space.

19. A system comprising:
an access module configured to access multiple images that correspond to projection nodes along a projection path within a three-dimensional (3D) space from which a two-dimensional (2D) scene that depicts at least some of the 3D space from a camera position is to be rendered;
a processor configured by a pixel module to determine pixel colors of the 2D scene that depicts at least some of the 3D space from the camera position, the pixel colors of the 2D scene being determined based on the multiple images that correspond to the projection nodes along the projection path within the 3D space;
a render module configured to render the 2D scene that depicts at least some of the 3D space from the camera position by rendering the pixel colors determined based on the multiple images that correspond to the projection nodes along the projection path within the 3D space;
the access module is configured to access an additional image that corresponds to an additional projection node along the projection path within the 3D space;
the pixel module configures the processor to determine additional pixel colors of an additional 2D scene that depicts at least some of the 3D space from an additional camera position; and
the render module is configured to render the additional 2D scene that depicts at least some of the 3D space from the additional camera position by rendering the additional pixel colors determined based on the additional image.

20. The system of claim 19, wherein the additional image is accessed based on a positioning of the additional projection node relative to a player position that represents a user within the 3D space.

* * * * *

UNITED STATES PATENT AND TRADEMARK OFFICE
CERTIFICATE OF CORRECTION

| | | |
|---|---|---|
| PATENT NO. | : 9,111,394 B1 | Page 1 of 1 |
| APPLICATION NO. | : 13/559442 | |
| DATED | : August 18, 2015 | |
| INVENTOR(S) | : Ho et al. | |

It is certified that error appears in the above-identified patent and that said Letters Patent is hereby corrected as shown below:

IN THE CLAIMS

In column 32, line 5, in Claim 17, delete "wherein the" and insert --wherein:--, therefor Signed and Sealed this
Twenty-sixth Day of January, 2016

Michelle K. Lee
*Director of the United States Patent and Trademark Office*